(12) United States Patent
Yoshida

(10) Patent No.: US 9,549,138 B2
(45) Date of Patent: Jan. 17, 2017

(54) IMAGING DEVICE, IMAGING SYSTEM, AND DRIVING METHOD OF IMAGING DEVICE USING COMPARATOR IN ANALOG-TO-DIGITAL CONVERTER

(71) Applicant: CANON KABUSHIKI KAISHA, Tokyo (JP)

(72) Inventor: Daisuke Yoshida, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 13/783,021

(22) Filed: Mar. 1, 2013

(65) Prior Publication Data

US 2013/0235240 A1    Sep. 12, 2013

(30) Foreign Application Priority Data

Mar. 7, 2012    (JP) ................................. 2012-050684

(51) Int. Cl.
| | |
|---|---|
| H04N 5/217 | (2011.01) |
| H04N 3/14 | (2006.01) |
| H04N 5/335 | (2011.01) |
| H04N 5/228 | (2006.01) |
| H04N 5/378 | (2011.01) |
| H04N 5/3745 | (2011.01) |

(52) U.S. Cl.
CPC ............ *H04N 5/378* (2013.01); *H04N 5/3745* (2013.01); *H04N 5/37457* (2013.01)

(58) Field of Classification Search
CPC .. H04N 5/3575; H04N 5/374; H04N 5/37457; H04N 5/37452; H04N 5/378; H04N 5/3658; H04N 5/3745; H01L 27/14603

USPC ...................... 348/294–310, 241–251, 222.1
See application file for complete search history.

(56) References Cited

U.S. PATENT DOCUMENTS

| | | | |
|---|---|---|---|
| 6,084,229 A | | 7/2000 | Pace |
| 6,115,066 A | * | 9/2000 | Gowda et al. ................ 348/308 |
| 6,339,215 B1 | * | 1/2002 | Yonemoto et al. ........ 250/208.1 |
| 6,882,367 B1 | * | 4/2005 | Merrill et al. ................ 348/308 |
| 7,502,059 B2 | * | 3/2009 | Barna ........................... 348/300 |
| 7,622,699 B2 | * | 11/2009 | Sakakibara et al. ........ 250/208.1 |
| 7,897,909 B2 | * | 3/2011 | Sakakibara et al. ....... 250/214 R |
| 8,115,159 B2 | * | 2/2012 | Sakakibara et al. ........ 250/208.1 |
| 2005/0179470 A1 | * | 8/2005 | Neaves ............................ 327/72 |

(Continued)

FOREIGN PATENT DOCUMENTS

| | | |
|---|---|---|
| JP | 2001-069404 A | 3/2001 |
| JP | 2001-223566 A | 8/2001 |

(Continued)

*Primary Examiner* — Chia-Wei A Chen
(74) *Attorney, Agent, or Firm* — Canon USA, Inc. IP Division

(57) ABSTRACT

Each of pixels in an imaging device includes a photoelectric converter and a first transistor. A signal based on a charge generated by the photoelectric converter is to be input into the first transistor. The imaging device includes a second transistor arranged at a ratio of one as to the pixels. A reference signal is to be input into the second transistor. The second transistor defines a differential pair together with the first transistor. The imaging device includes a comparator including the first transistor and the second transistor. Each of the pixels includes a selecting unit configured to turn off the first transistor by applying the first voltage to a control node of the first transistor.

17 Claims, 13 Drawing Sheets

(56) References Cited

U.S. PATENT DOCUMENTS

| | | | |
|---|---|---|---|
| 2005/0185078 A1* | 8/2005 | Segura-Puchades | 348/308 |
| 2008/0258047 A1* | 10/2008 | Sakakibara et al. | 250/214 C |
| 2009/0322924 A1* | 12/2009 | Inagaki et al. | 348/308 |
| 2010/0013976 A1* | 1/2010 | Sakakibara et al. | 348/311 |
| 2010/0253772 A1* | 10/2010 | Toyama et al. | 348/61 |
| 2010/0271521 A1* | 10/2010 | Kawaguchi et al. | 348/302 |
| 2011/0102656 A1* | 5/2011 | Hatano et al. | 348/302 |
| 2011/0115959 A1* | 5/2011 | Toyama et al. | 348/308 |
| 2011/0127409 A1* | 6/2011 | Sakakibara et al. | 250/208.1 |
| 2011/0128428 A1* | 6/2011 | Takatoku et al. | 348/307 |
| 2011/0134286 A1* | 6/2011 | Inoue et al. | 348/241 |
| 2011/0141324 A1* | 6/2011 | Koseki | 348/241 |
| 2011/0205416 A1* | 8/2011 | Nishihara | 348/300 |
| 2011/0242381 A1* | 10/2011 | Sakakibara et al. | 348/301 |
| 2011/0273601 A1* | 11/2011 | Egawa | 348/300 |
| 2011/0304757 A1* | 12/2011 | Egawa | 348/300 |
| 2012/0038807 A1* | 2/2012 | Ackland et al. | 348/300 |
| 2012/0092540 A1* | 4/2012 | Shinohara | 348/308 |

FOREIGN PATENT DOCUMENTS

| | | |
|---|---|---|
| JP | 2005-311487 A | 11/2005 |
| JP | 2008-271280 A | 11/2008 |

* cited by examiner

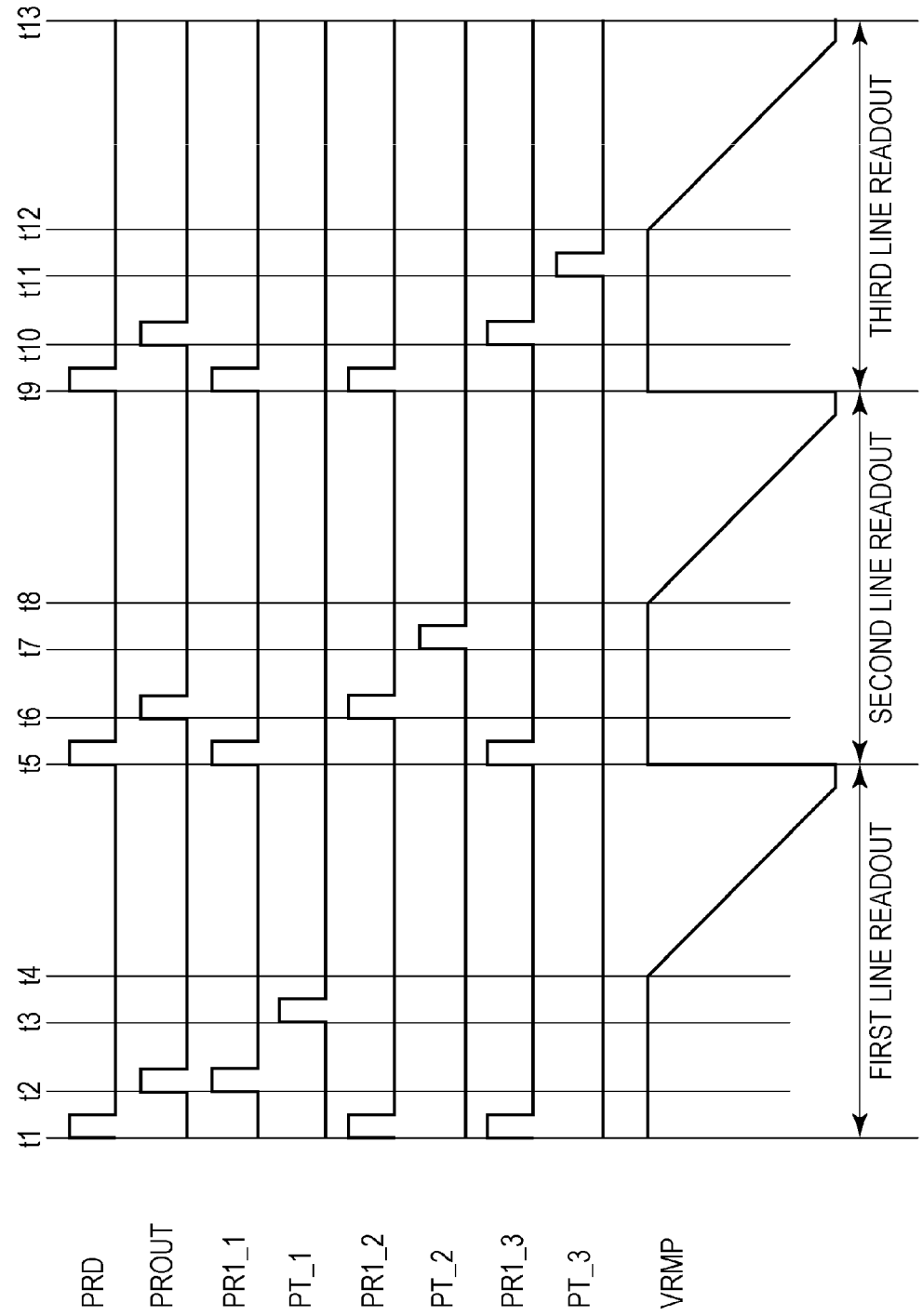

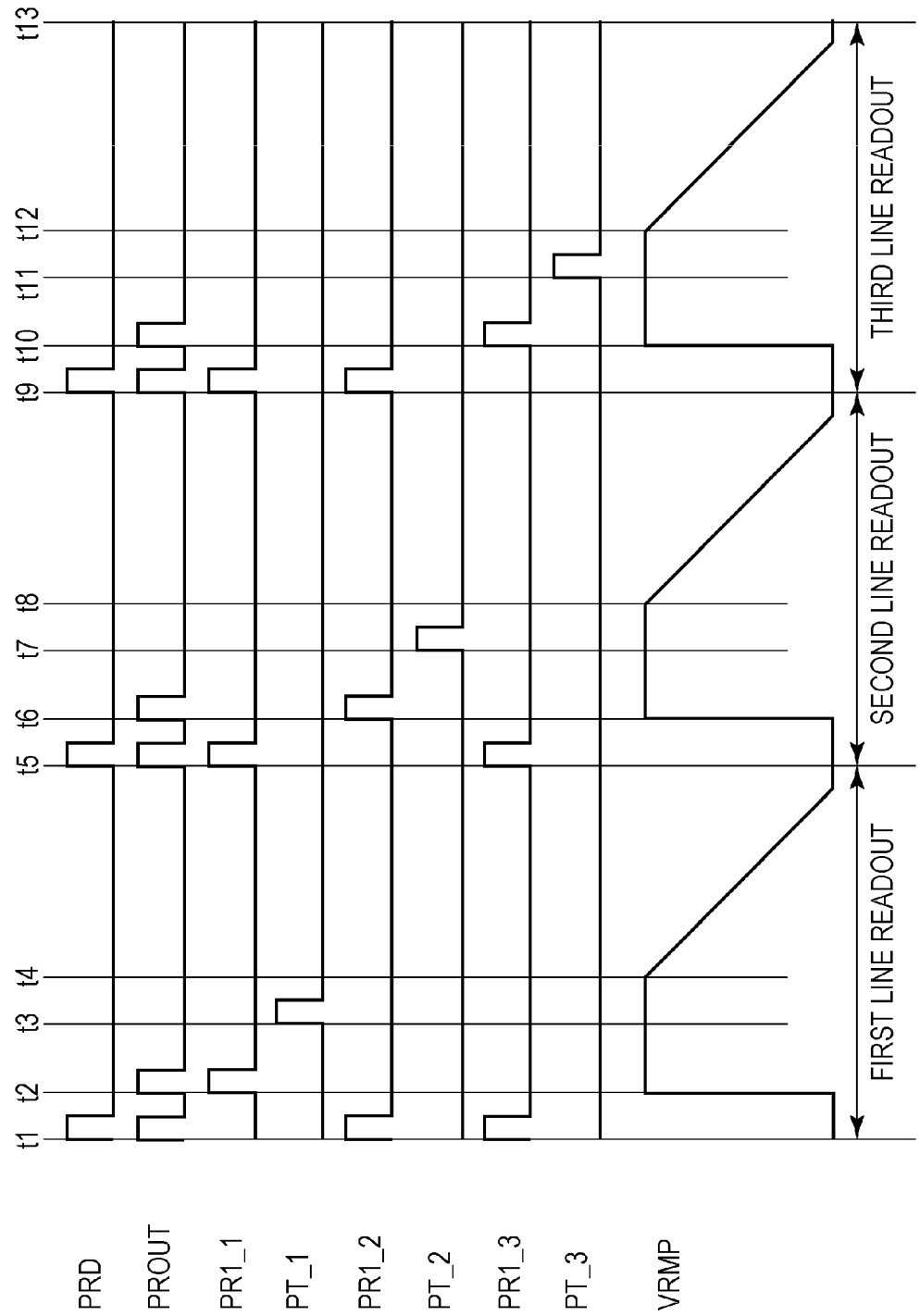

IMAGING DEVICE, IMAGING SYSTEM, AND DRIVING METHOD OF IMAGING DEVICE USING COMPARATOR IN ANALOG-TO-DIGITAL CONVERTER

BACKGROUND OF THE INVENTION

Field of the Invention

The disclosure relates to an imaging device, an imaging system, and a driving method of an imaging device.

Description of the Related Art

Recently, an imaging device including a comparator for comparing a signal based on a charge generated by a photoelectric converter with a reference signal has been proposed.

According to an imaging device disclosed in FIG. 2 of Japanese Patent Laid-Open No. 2001-223566, one comparator is used as to multiple pixels. Specifically, one pixel has a photoelectric converter 201, a transistor 204 disposed in a current pathway, and a selecting transistor 207 connected serially to the transistor 204. The transistor 204 and selecting transistor 207 that are included in the pixel define a first current pathway block 210. On the other hand, a transistor 213 connected to a reference voltage input terminal and a dummy selecting transistor 214 define a second current pathway block 211. Also, the first current pathway block 210 and second current pathway block 211 define a differential pair. According to the imaging device disclosed in Japanese Patent Laid-Open No. 2001-223566, one second current pathway block 211 is disposed as to multiple first current pathway blocks 210, i.e. as to multiple pixels.

SUMMARY OF THE INVENTION

An imaging device according to an embodiment comprises multiple pixels. Each of the pixels includes a photoelectric converter and a first transistor. A signal based on a charge generated by the photoelectric converter is to be input into the first transistor. The imaging device comprises a second transistor arranged at a ratio of one as to the pixels. The second transistor defines a differential pair together with the first transistor. A reference signal is to be input into the second transistor. The imaging device comprises a comparator including the first transistor and the second transistor. Each of the pixels includes a selecting unit configured to turn off the first transistor by applying a first voltage to a control node of the first transistor.

A driving method of an imaging device according to an embodiment includes selectively applying a first voltage for turning off the first transistor and a second voltage for turning on the first transistor into control nodes of first transistors, thereby turning off a first portion of the first transistors, and turning on at least a second portion of the first transistors. The driving method includes inputting, into each of the second portion of the first transistors, a signal based on a charge generated by the photoelectric converter, following the selectively applying of the first and second voltages. The driving method includes comparing the signal input into the first transistor and the reference signal input into the second transistor, following the inputting of the signal.

Further features of the disclosure will become apparent from the following description of exemplary embodiments with reference to the attached drawings.

BRIEF DESCRIPTION OF THE DRAWINGS

FIG. 3 is a diagram schematically illustrating a timing chart of a driving signal of an imaging device according to the embodiment.

FIG. 6 is a diagram schematically illustrating a timing chart of a driving signal of an imaging device according to the embodiment.

DESCRIPTION OF THE EMBODIMENTS

According to some embodiments of the disclosure, driving of an imaging device at a high speed may be performed. In some imaging devices, there may be cases wherein a selecting transistor is serially connected as to a current pathway. In this case, high speed driving of the imaging device becomes difficult. This problem will be briefly described.

In an imaging device having multiple pixels, when the size of transistors disposed on each pixel increases, the chip area increases significantly. Alternatively, if the size of transistors disposed on each pixel is large, the ratio of area on the pixel that the photoelectric converter covers may decrease. For such reasons, the size of selecting transistor disposed on each pixel may be restricted. Therefore, there are cases where the resistance increases when the selecting transistor is turned on. As a result, the speed of current change decreases, whereby driving the imaging device at high speed may be difficult. Conversely, imaging devices according to some embodiments can perform high-speed driving.

Figure 1:
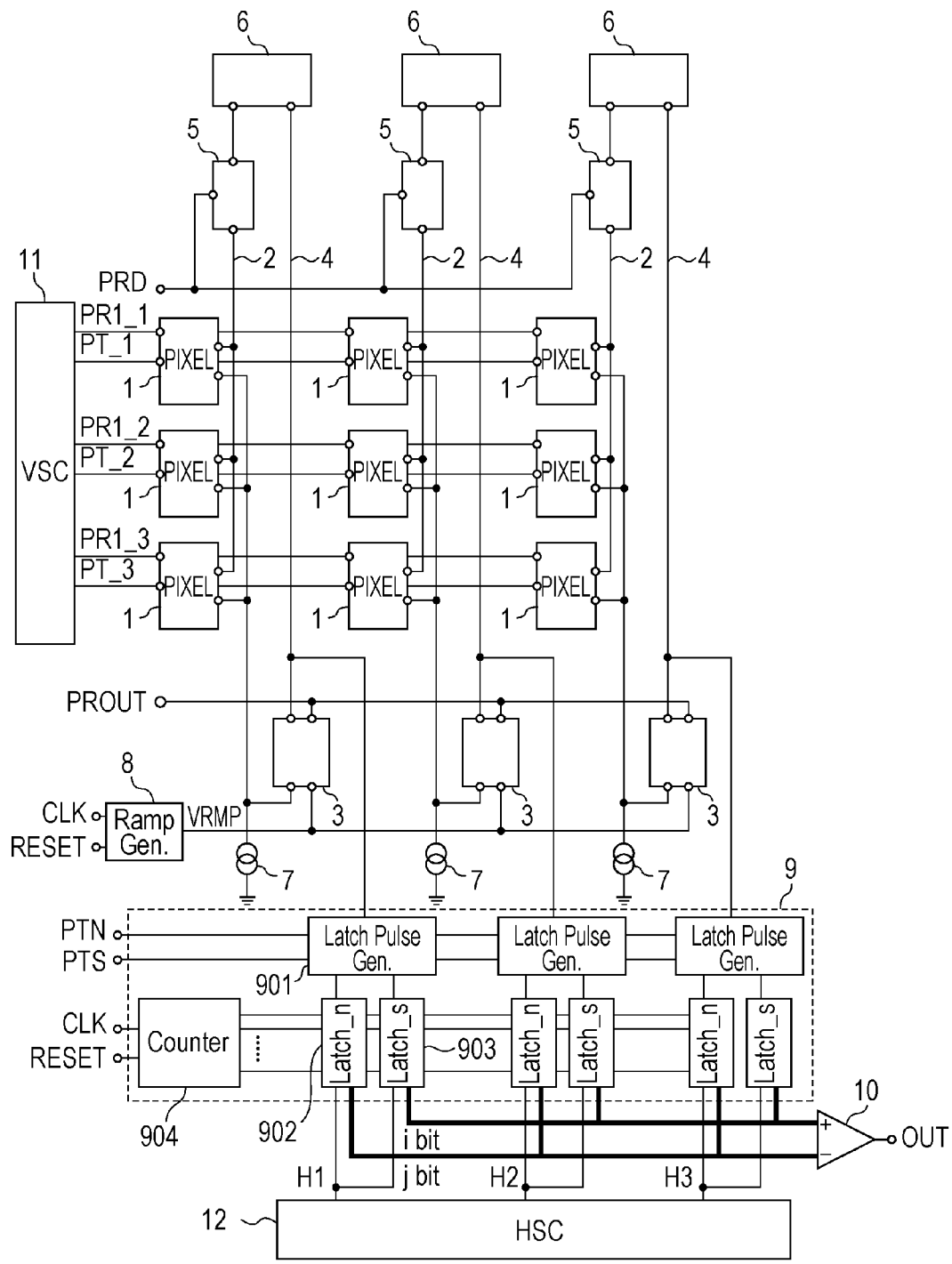
FIG. 1 is a block diagram illustrating a configuration of an imaging device according to an embodiment.

An imaging device according to some embodiments of the disclosure will be described with reference to the appended drawings. FIGS. 1 and 2 illustrate an example of a configuration of an imaging device according to some embodiments of the disclosure. In FIG. 1 the parts of the imaging device are illustrated in blocks, and in FIGS. 2A through 2F, a specific circuit example is illustrated for the blocks.

Figure 2A:
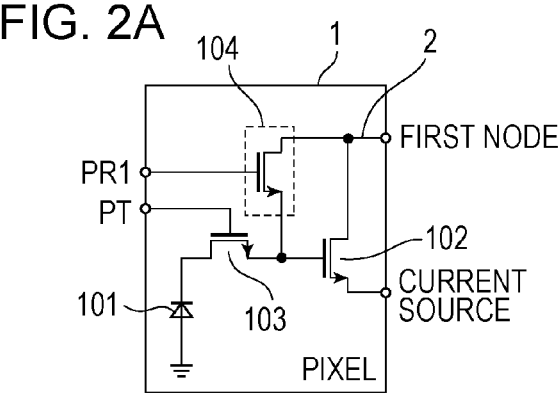
FIGS. 2A through 2F are circuit diagrams illustrating a configuration of an imaging device according to the embodiment.
Figure 2D:
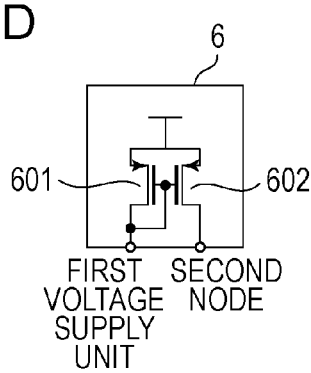
Figure 2B:
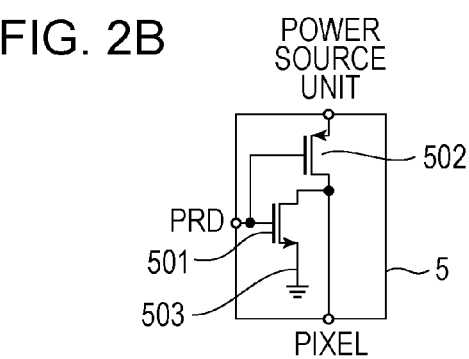
Figure 2E:
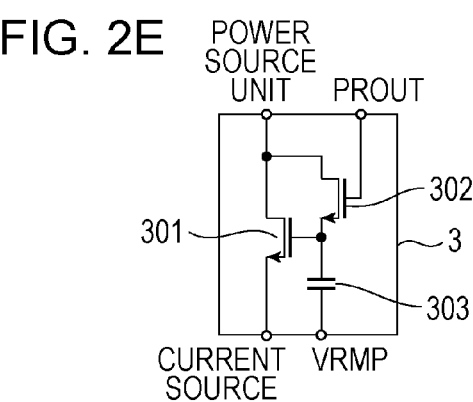

The imaging device has multiple pixels 1. An example of a configuration of the pixel 1 is illustrated in FIG. 2A. Each pixel 1 includes a photoelectric converter 101 and first transistor 102. Also, a circuit unit 3 is disposed as to three pixels 1 arrayed in the column direction. A specific circuit of the circuit unit 3 is illustrated in FIG. 2E. A second transistor 301 is included in the circuit unit 3. That is to say, the second transistors 301 are disposed at a ratio of one to multiple pixels 1. The first transistor 102 and second transistor 301 define, or constitute, a differential pair.

The imaging apparatus according to some embodiments of the disclosure has a comparator that is configured including the first transistor 102 and second transistor 301. A signal based on the charge generated by the photoelectric converter 101 is input into the first transistor 102. A reference signal is input into the second transistor 301. The comparator compares the signal based on the charge generated by the photoelectric converter 101 of the pixel 1 that is selected from the multiple pixels 1, and the reference signal. Also, the comparator outputs a signal based on the comparison results. For example, voltage of the main node of the second transistor 301 changes according to the size relation between the signal based on the charge generated by the photoelectric converter and the reference signal. In this case, the voltage of the main node of the second transistor 301 may be said to be a signal based on the comparison results. The signal based on the comparison results may also be a current signal.

The multiple pixels 1 are in a selecting state by the first transistor 102 being turned on, and are in a non-selecting state by the first transistor 102 being turned off. In imaging devices according to some embodiments of the disclosure, the On and Off of the first transistor 102 are controlled by the voltage applied to a control node of the first transistor 102.

Specifically, a selecting unit that applies a first voltage to turn off the first transistor 102 to the control node of the first transistor 102 is included in the pixel. The selecting unit may include a selecting transistor 104 having one of the main nodes connected to the control node of the first transistor. In this case, the other main node of the selecting transistor 104 is connected to a node to which the first voltage is supplied. Specifically, one or the other of the main nodes of the first transistor 102 is connected to the selecting unit 104.

Alternatively, a configuration may be made to include a configuration where the selecting unit controls the voltage of the control node of the first transistor 102 via a coupling capacitance that is connected to the control node. Alternatively, a configuration may be made to include a configuration where the selecting unit injects a hot carrier in a semiconductor region connected to the control node of the first transistor 102. In this case, the voltage of the control node is controlled by the amount of carrier injected in the semiconductor region.

The first voltage is lower than a second voltage that is applied to the control node of the first transistor 102 in order to turn on the first transistor 102. The first voltage may be a voltage where the voltage of the control node of the first transistor 102 is lower than a threshold voltage of the first transistor 102.

Also, the second voltage that turns on the first transistor 102 may be applied to the control node of the first transistor 102 via the selecting unit. Alternatively, the second voltage may be applied to the control node of the first transistor 102 via an electric pathway that is separate from the selecting unit. The second voltage may be a voltage where the voltage of the control node of the first transistor 102 is higher than a threshold voltage of the first transistor 102.

A MOS transistor, bipolar transistor, JFET, or the like may be used for the first transistor 102 and second transistor 301. Note that in the present Specification, an embodiment will be described exemplifying a transistor included in an imaging device that is a MOS transistor. In the case that the transistor is a MOS transistor, the control node of the transistor is a gate, and the main nodes of the transistor is the source and drain. Embodiments where the transistor included in the imaging device is a bipolar transistor or JFET are also embodiment of the disclosure. In the case of a bipolar transistor, the gate, drain, and source may be read as base, collector, and emitter, respectively.

Advantages of some embodiments will be described. An imaging device according to some embodiments of the disclosure selects at least one pixel 1 from the multiple pixels 1, and compares a signal from the photoelectric converter 101 of the selected pixel 1 with a reference signal. At this time, in the unselected pixels 1, the first voltage is applied to the control node of the first transistor 102, whereby the first transistor 102 is turned off. Accordingly, even if the transistor for selecting the pixel 1 is not serially connected with the first transistor 102, the pixel 1 can be selected. According to such a configuration, resistance of the pathway where current flows through the first transistor 102 can be reduced. Consequently, the current value can be rapidly changed according to the signals input into the first transistor 102, whereby the imaging device can be driven at a high speed.

An embodiment of an imaging device according to the disclosure will be described in detail below. Note that in the embodiment below, the first transistor 102 and second transistor 301 are N-channel-type transistors. Conversely, an embodiment where the first transistor 102 and second transistor 301 are P-channel-type transistors is also an embodiment of the disclosure. In this case, the conductivity type of the transistors in each embodiment may be reversed, and the size relation of the voltage supplied to each node may be inverted. For example, the first voltage which turns off the first transistor 102 is voltage that is higher than the second voltage which turns on the first transistor 102. Also, in the embodiment where the first transistor 102 and second transistor 301 are P-channel-type transistors, a grounding voltage is supplied to the node to which the power source voltage is supplied in each diagram, and the power source voltage is supplied to the node to which the grounding voltage is supplied.

First Embodiment

An embodiment relating to the disclosure will be described. An entire block diagram of an imaging device according to some embodiments is illustrated in FIG. 1. The imaging device according to some embodiments may be formed on a semiconductor substrate. The imaging device according to some embodiments has multiple pixels 1, a first node 2, circuit unit 3 that includes a second transistor, second node 4, first voltage supplying unit 5, power source unit 6, current source 7, reference signal output unit 8, AD converting unit 9, output unit 10, vertical scanning circuit 11, and horizontal scanning circuit 12.

The first transistor included in the pixel 1 and the second transistor included in the circuit unit 3 define, or constitute, a differential pair. In FIG. 1, one second transistor is disposed in one column that includes three pixels. Thus, the second transistors are disposed at the ratio of one as to multiple pixels. Also, the comparator which the imaging device according to some embodiments has is configured to include the first transistor and second transistor.

The pixel 1 includes a selecting unit. The selecting unit according to some embodiments includes a selecting transistor that connects the first node 2 and the gate electrode of the first transistor. The first voltage which turns off the first transistor and the second voltage which turns on the first transistor are supplied to the gate of the first transistor via the selecting transistor. In some embodiments, the first voltage is a grounding voltage.

In the pixel 1, a charge is generated according to incident light. The vertical scanning circuit 11 supplies a driving signal to the pixel 1. A predetermined pixel 1 is selected based on the driving signal from the vertical scanning circuit 11. The comparator compares the signal of the selected pixel 1 and a reference signal output by the reference signal output unit 8. Also, the signal of the selected pixel 1 is converted into a digital signal by the comparator, and a latch-pulse generating unit 901, N-latch circuit 902, S-latch circuit 903, and counter 904. More specifically, the counter 904 starts counting corresponding to the start of the comparison. Also, the N-latch circuit 902 or S-latch circuit 903 holds the count value corresponding to the signal of the pixel 1, based on the signal output by the comparator. The digital signal is read out to the output unit 10 by the horizontal scanning circuit 12. The output unit 10 outputs the digital signal externally. Note that in FIG. 1, for descriptive purposes, the latch-pulse generating unit 901, N-latch circuit 902, S-latch circuit 903, and counter 904 are exemplified as elements included in the AD converting unit 9. Further, a comparator may also be included in the AD converting unit 9.

A detailed configuration of the parts will be described. Multiple pixels 1 are disposed so as to configure a pixel array of three rows and three columns. The number of pixels 1 may be any number that is multiple. For example, a pixel array may be configured where multiple pixels 1 are arrayed in 1000 or more rows and 1500 or more columns. Alternatively, multiple pixels 1 may be arrayed in one column and configure a line sensor.

The signals of the multiple pixels 1 included in one pixel column are processed by a common circuit. A circuit to process a signal from the pixel 1 disposed in one pixel column will be exemplified and described below. Note that other pixel columns are of the same circuit configuration as the pixel column being described.

A configuration of a pixel 1 according to some embodiments is illustrated in FIG. 2A. The pixel 1 includes at least a photoelectric converter 101 and first transistor 102. The pixel 1 according to some embodiments further includes a transfer transistor 103 and selecting transistor 104. The selecting transistor 104 makes up a selecting unit. The first transistor 102, transfer transistor 103, and selecting transistor 104 are each N-channel-type MOS transistors.

The drain of the first transistor 102 is connected to the first node 2. The drains of the first transistors 102 included in the multiple pixels 1 are connected by a common first node 2. The source of the first transistor 102 is connected to the current source 7. The source of the first transistors 102 of the multiple pixel 1 may be connected to a common current source 7. The transfer transistor 103 is disposed in an electrical pathway between the photoelectric converter 101 and the gate of the first transistor 102. The drain of the selecting transistor 104 is connected to the first node 2. The source of the selecting transistor 104 is connected to the gate of the first transistor 102.

In a photoelectric converter 101 included in the pixels 1, the incident light is converted to a charge by photoelectric conversion. The photoelectric converter 101 may accumulate the charge generated by the photoelectric conversion. The photoelectric converter 101 is a photodiode, for example. The signal based on the charge generated by the photoelectric converter 101 is input in the first transistor 102. This signal herein may be the charge itself that is generated by the photoelectric converter 101. In this case, the generated charge may be accumulated in a semiconductor region connected to the gate of the first transistor 102. Alternatively, the generated charge may be transferred to the control node of the first transistor 102 by a transfer unit. Also, the signal based on the charge generated by the photoelectric converter 101 may be a voltage signal or a current signal. In this case, an amplifying circuit may be configured in the electrical pathway between the photoelectric converter 101 and the first transistor 102.

According to some embodiments, the charge generated by the photoelectric converter 101 is transferred to a floating diffusion region (hereinafter called FD region) via the transfer transistor 103. The FD region is a semiconductor region connected to the gate of the first transistor 102. The transfer transistor 103 may perform charge transfer by controlling the potential between the photoelectric converter 101 and the FD region.

A driving signal PT is supplied to the gate of the transfer transistor from the vertical scanning circuit 11. A driving signal PR1 is supplied to the gate of the selecting transistor from the vertical scanning circuit 11. Each transistor is controlled on and off by the driving signals PT and PR1. That is to say, the vertical scanning circuit 11 is a control unit that controls the transfer transistor 103 and selecting transistor 104. Note that the vertical scanning circuit 11 can supply driving signals concurrently or synchronously to the multiple pixels 1 included in the same pixel row. Also, the vertical scanning circuit 11 can supply mutually independent driving signals to the multiple pixels 1 included in different pixel row.

The first voltage supply unit 5 is connected to the first node 2. The first voltage supply unit 5 may supply the first voltage to the first node 2. Alternatively, the first voltage supply unit 5 may selectively supply the first voltage and second voltage to the first node 2. A specific circuit configuration of the first voltage supply unit 5 is illustrated in FIG. 2B. The first voltage supply unit 5 includes an N-channel-type transistor 501 and P-channel-type transistor 502.

Figure 2C:
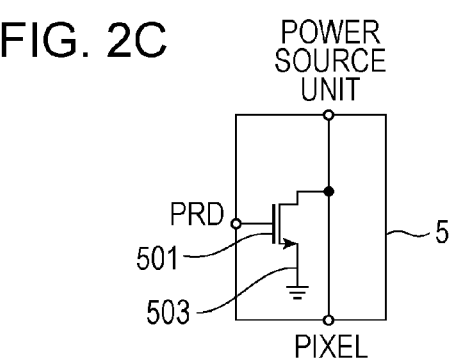

The drain of the N-channel-type transistor 501 is connected to the first node 2. The source of the N-channel-type transistor 501 is connected to the first voltage node 503 to which the first voltage is supplied. According to some embodiments, the first voltage is the grounding voltage. That is to say, the source of the N-channel-type transistor 501 is grounded. The N-channel-type transistor 501 may control the conductive state of the electric pathway between the first voltage node 503 and first node 2. The first voltage node 503 may be made up of a conductive material such as metal, or may be made up of a semiconductor region. Alternatively, the first voltage node 503 may be configured to include a conductive material and semiconductor region. The drain of the P-channel-type transistor 502 is connected to the first node 2. The source of the P-channel-type transistor 502 is connected to the power source unit 6. The P-channel-type transistor 502 may control the conductive state of the electric pathway between the power node VDD to which power voltage is supplied and the first node 2. The gate of the N-channel-type transistor 501 and the gate of the P-channel-type transistor are mutually connected. Also, a driving signal PRD is supplied to the two transistor gates. The two transistors are controlled on and off by the driving signal PRD. The vertical scanning circuit 11 may supply the driving signal PRD. That is to say, the vertical scanning circuit 11 may be a control unit that controls the first power supply unit 5. Upon the N-channel-type transistor 501 being turned on, the first voltage supply unit 5 supplies the first voltage to the first node 2. Upon the P-channel-type transistor 502 being turned on, the first voltage supply unit 5 supplies the second voltage to the first node 2. Note that, as illustrated in FIG. 2C, the P-channel-type transistor 502 may be omitted. In this case, the first node 2 is connected to the power source unit 6.

Next, the power source unit 6 will be described. A specific circuit configuration of the power source unit 6 is illustrated in FIG. 2D. The power source unit 6 includes a third transistor 601 and fourth transistor 602. The third transistor 601 and fourth transistor 602 are both P-channel-type MOS transistors.

The source of the third transistor 601 is connected to the power node VDD to which power voltage is supplied. The drain of the third transistor 601 is connected to the first voltage supply unit 5. The source of the fourth transistor 602 is connected to the power node VDD. The drain of the fourth transistor 601 is connected to the second node 4. The gate of the third transistor 601 and the gate of the fourth transistor 602 are mutually connected, and further are connected to the drain of the third transistor 601.

Now, the third transistor 601 and fourth transistor 602 define, or constitute, a current mirror that is connected to the drain of the first transistor 102 and a drain of a later-described second transistor. An active load such as a current mirror may be connected to the two transistors that define a differential pair, whereby changes in the output of the comparator may be increased as to changes in the input signal. That is to say, a comparison can be made at a higher speed.

Operations to select or non-select a pixel in the above-described configuration will be described. At the time that the first voltage which turns off the first transistor is supplied to the first node 2, the first voltage is applied to the gate of the first transistor 102 by turning on the selecting transistor 104 of the pixel 1. The node to which the gate of the first transistor 102 is connected is in a floating state, and has a parasitic capacitance (not shown). Therefore, even after the selecting transistor 104 is turned off, the first voltage is held in the gate of the first transistor 102. Thus, the pixel 1 becomes non-selected. On the other hand, at the time that the second voltage which turns on the first transistor is supplied to the first node 2, the second voltage is applied to the gate of the first transistor 102 by turning on the selecting transistor 104 of the pixel 1. After the second voltage has been supplied, the selecting transistor 104 turns off, whereby the second voltage is held in the gate of the first transistor 102. Thus, the pixel 1 is selected. Note that the second voltage may be a voltage that serves as a standard before the charge is transferred, i.e. may be a reset voltage.

In order to supply the first voltage to the first node 2, a driving signal PRD, such that the N-channel-type transistor 501 of the first voltage supplying unit 5 turns on and the P-channel-type transistor 502 turns off, is input into the first voltage supplying unit 5. On the other hand, in order to supply the second voltage to the first node 2, a driving signal PRD, such that the N-channel-type transistor 501 of the first voltage supplying unit 5 turns off and the P-channel-type transistor 502 turns on, is input into the first voltage supply unit 5. Upon the P-channel-type transistor 502 being turned on, the second voltage is supplied from the power source unit 6 to the first node.

Now, in the case that the first voltage supplying unit 5 is a circuit as illustrated in FIG. 2B, the P-channel-type transistor 502 is disposed in the electrical pathway between the power source unit 6 and the first transistor 102. However, only at least one P-channel-type transistor 502 has to be provided to each pixel row. Therefore, even if the size is large, the chip area does not increase significantly. Alternatively, the P-channel-type transistor 502 is not included in the pixel 1, whereby even if the size is large, the area of the photoelectric converter 101 is not significantly affected. Accordingly, as the resistance can be made sufficiently small when turned on, the size of the P-channel-type transistor 502 can be made larger. Also, in the case that the first voltage supplying unit 5 is a circuit illustrated in FIG. 2C, a transistor does not have to be disposed in the pathway between the power source unit 6 and the first transistor 102.

Next, the circuit unit 3 that includes the second transistor which makes up a differential pair with the first transistor will be described. A specific circuit configuration of the circuit unit 3 is illustrated in FIG. 2E. The circuit 3 has a second transistor 301, connecting transistor 302, and capacitance 303. The second transistor 301 and connecting transistor 302 are both N-channel-type MOS transistors.

The drain of the second transistor 301 is connected to a second node 4. The second node 4 is connected to the drain of a fourth transistor 602 of the power source unit 6, as described above. The source of the second transistor 301 is connected to the current source 7. The drain of the connecting transistor 302 is connected to the second node 4. The source of the connecting transistor 302 is connected to the gate of the second transistor 301.

The gate of the second transistor 301 is connected to the reference signal output unit 8 via the capacitance 303. That is to say, one of the electrodes of the capacitance 303 is connected to the gate of the second transistor 301, and the other electrode of the capacitance 303 is connected to the reference signal output unit 8. A driving signal PROUT is supplied to the gate of the connecting transistor 302. The vertical scanning circuit 11 may supply the driving signal PROUT.

The source of the first transistor 102 and the source of the second transistor 301 are connected to a common current source 7. Also, the drain of the first transistor 102 and the drain of the second transistor 301 are each connected to the power source unit 6. With such a configuration, the first transistor 102 and second transistor 301 define, or constitute, a differential pair. That is to say, according to the size relation of voltage of the two gates, the size relation of current flowing to each changes. Therefore, the voltage at the gate of the first transistor 102 and the voltage at the gate of the second transistor can be compared. For example, if the voltage of the gate of the first transistor 102 is higher than the voltage of the gate of the second transistor 301, the voltage at the drain of the second transistor 304 becomes a first output voltage value. Conversely, if the voltage of the gate of the first transistor 102 is lower than the voltage of the gate of the second transistor 301, the voltage at the drain of the second transistor 304 becomes a second output voltage value. According to some embodiments, the first output voltage value is a voltage value that is nearer the power voltage as compared to the second output voltage value. Thus, the voltage output to the drain of the second transistor 304 changes, based on the result of comparing the size of the voltage at the gate of the first transistor 102 and the voltage at the gate of the second transistor 301.

In the circuit in FIG. 2E, the connecting transistor 302 may be turned on at the time that the pixel 1 is selected. By the connecting transistor 302 being turned on, the drain and gate of the second transistor 301 short circuits. That is to say, the input node and output node of the differential circuit short circuits. Thus, the voltage at the gate of the first transistor 102 and the voltage at the gate of the second transistor 301 can become approximately equal. In other words, a voltage follower that includes the first transistor 102 and second transistor 301 is configured. Also, the voltage at the gate of the first transistor 102 which is the input node and the voltage at the drain of the second transistor 301 which is the output node becomes the same. Having little difference, or no difference, between the voltage at the gate of the first transistor 102 and the voltage at the gate of the second transistor 301 at the time of selecting the pixel 1, enables a more precise comparison.

In the circuit in FIG. 2E, the output node of the reference signal output unit 8 and the gate of the second transistor 301 are coupled by the capacitance 303. Therefore, the voltage of the output node of the reference signal output unit 8 and the voltage at the gate of the second transistor 301 can be independently set. Consequently, the initial value of a lamp signal output by the reference signal output unit 8 does not have to match the voltage at the gate of the first transistor 102 at the time that the pixel 1 had been selected. Therefore, a more precise comparison can be made.

Figure 2F:
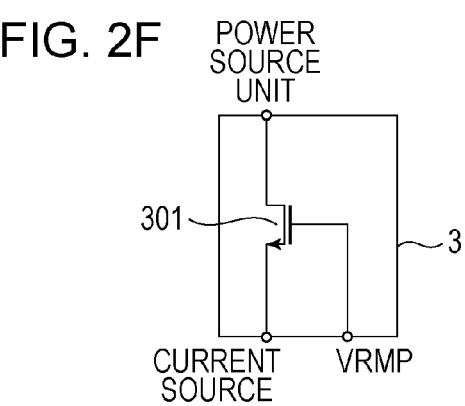

Note that one or both of the connecting transistor 302 and capacitance 303 may be omitted. FIG. 2F illustrates a circuit unit 3 where both the connecting transistor 302 and capacitance 303 are omitted.

The reference signal output unit 8 outputs a reference signal. The reference signal is a ramp signal where the voltage value changes continuously or in stages according to time, for example. In the case that such a reference signal is used, a slope-type of AD (Analog to Digital) conversion can be performed based on the comparison results. Alternatively, multiple different voltages may be input sequentially to serve as the reference signal. In the case that such a reference signal is used, successive-comparison AD conversion can be performed based on the comparison results. Alternatively, a fixed voltage may be input to serve as the reference signal. Such a reference signal may be used in a case to determine whether the signal from the photoelectric converter is greater or smaller than a predetermined value. Also, the reference signal may be a current signal. Note that the AD conversion method is not to be restricted to the methods mentioned here, and known AD conversion methods may be used.

According to some embodiments, the reference signal output unit 8 outputs a ramp signal VRMP, the size of which changes continuously. Alternatively, the ramp signal VRMP may change in size in stages each time a predetermined amount of time passes, following a clock signal CLK. Also, a ramp reset signal is supplied to the reference signal output unit 8 from a reset node. Based on the ramp reset signal, the ramp signal VRMP output by the reference signal output unit 8 is reset to initial values.

By comparing the signal based on charge generated by the photoelectric converter 101 and the ramp signal VRMP, the signal from the photoelectric converter 101 can be converted to a digital signal. For example, in a state that a signal based on the charge generated by the photoelectric converter 101 is input into the gate of the first transistor 102, the ramp signal VRMP may be input into the gate of the second transistor 301. A count may be then performed according to the changes in the ramp signal, and the count value at the point in time that the voltage of the drain of the second transistor 304 is inverted may be either held or output.

An example of a configuration to perform AD conversion will be described below. The Second node 4 is connected to an AD converter 9. That is to say, the voltage at the drain of the second transistor 301 is input into the AD converter 9.

According to some embodiments, the AD converter 9 includes a latch pulse generating unit 901, a N-latch circuit 902, S-latch circuit 903, and counter 904. The second node 4 is connected to the latch pulse generating unit 901. Also, a driving signal PTN and driving signal PTS are supplied to the latch pulse generating unit 901. The driving signals herein are driving signals to select the output destination of the latch pulse. The latch pulse generating unit 901 selectively outputs a latch pulse to the later-stage N-latch circuit 902 and S-latch circuit 903, according to the timing that the voltage of the second node 4 is inverted.

A count value from the counter 904 is input into the N-latch circuit 902 and S-latch circuit 903. Upon the latch pulse being input, the N-latch circuit 902 and S-latch circuit 903 hold the count values that are input at that point in time.

The counter 904 causes the output count value to change according to the clock signal CLK. Also, based on the counter reset signal supplied to the reset node, the count value output by the counter 904 is reset to initial values. While details will be described later, the count value according to size of ramp signal VRMP is held in each latch circuit by inputting mutually synchronized driving signals into the reference signal output unit 8 and counter 904. That is to say, the signal from the photoelectric converter 101 is converted into a digital signal.

The memory unit (N-latch circuit 902 and S-latch circuit 903) is electrically connected to the output unit 10. Specifically, the N-latch circuit 902 is connected to the output unit 10 via a first output line. The S-latch circuit 903 is connected to the output unit 10 via a second output line.

The horizontal scanning circuit 12 supplies a driving signal to each latch circuit. Based on the driving signals from the horizontal scanning circuit 12, each latch circuit outputs the counter value being held therein as a digital signal to the output unit 10.

The output unit 10 outputs the digital signal externally. For example, the output unit 10 outputs the difference between the digital signal held in the S-latch circuit 903 and the digital signal held in the N-latch circuit 902. A counter value corresponding to a state wherein each pixel 1 has been reset, and a counter value corresponding to the signal based on the charge generated by the photoelectric converter, may be held in the N-latch circuit 902 and S-latch circuit 903. By subtraction of the two in the form of digital signals, correlated double sampling CDS can be performed. With the CDS, unevenness in features in each pixel and influences from voltage comparison circuit offset can be reduced.

Note that an example where one counter 904 is disposed as to multiple pixel columns has been described here. A configuration may be used where a counter 904 is disposed for each column and the count value is controlled for each column based on the comparison results of each column.

Next, operations of an imaging device according to some embodiments will be described. FIG. 3 illustrates a timing chart of driving signals and a reference signal. The driving signal PRD is supplied to the first voltage supplying unit 5 in FIG. 1. The driving signal PROUT is supplied to the circuit unit 3 that includes the second transistor in FIG. 1. The driving signals PR1 and PT are supplied to the gate of the selecting transistor 104 and the gate of the transfer transistor 103 in FIG. 2A, respectively. The ramp signal VRMP is a reference signal output by the reference signal output unit 8.

Now, operations to read out signals from nine pixels 1 that are arrayed so as to configure a matrix of three rows and three columns will be described. Driving signals are synchronized and supplied to the three pixels 1 included in one row. Therefore, the signals from three pixels 1 included in one row are read out in parallel. The readout by row is performed sequentially or randomly. For ease of description, a notation indicating the row number denotes the driving signals PR1 and PT. For example, in FIG. 3 the driving signal PR1_1 is supplied to the pixel 1 included in the row disposed at the topmost of the diagram of the three rows. The driving signal PR1_2 is supplied to the pixel 1 included in the row disposed at the second from the top of the diagram of the three rows.

In FIG. 3, a high level driving signal is the voltage that turns on the N-channel-type transistor. In the same diagram, a low level driving signal is the voltage that turns off the N-channel-type transistor. Note that the P-channel-type transistor 502 is turned off when the driving signal PRD is high level, and is turned on when the driving signal PRD is low level. The high level driving signal is a power voltage, for example. The low level driving signal is a grounding voltage, for example.

First, the signal from the pixels 1 in the first row from the top of FIG. 1 is readout between the point-in-time t1 to the point-in-time t5 in FIG. 3.

At point-in-time t1, the driving signals PRD, PR1_2, and PR1_3 are at a high level. The other driving signals are at a low level. By the driving signal PRD being at a high level, the first voltage is supplied to the first node 2. By the driving signals PR1_2 and PR1_3 being at a high level, the pixel 1 included in the second row from the top of FIG. 1 and the pixel 1 included in the third row from the top of FIG. 1 are non-selected. That is to say, the first voltage is supplied to the gate of the first transistor 102 of these pixels 1, via the selecting transistor 104. Subsequently, the driving signals PRD, PR1_2, and PR1_3 become low level. Note that a point-in-time t1, the reference signal output unit 8 outputs the initial value of the ramp signal VRMP.

At point-in-time t2, the driving signals PROUT and PR1_1 are at a high level. Since the driving signal PRD is at a low level at point-in-time t2, the driving signal PR1_1 is at a high level, whereby a pixel included in the topmost row in FIG. 1 is selected. That is to say, the second voltage is applied to the gate of the first transistor 102. Also, the driving signals PR1_1 and PROUT are at high levels, so the voltage at the gate of the first transistor 102 and the voltage at the gate of the second transistor 301 become roughly equal. Thus, the voltage at the gate of the first transistor 102 and the voltage at the gate of the second transistor 301 are reset. Subsequently, the driving signals PROUT and PR1_1 are at low levels.

From the operations at point-in-time t1 and the operations at point-in-time t2, the pixel included in the topmost row in FIG. 1 is selected, and the pixels included in the second and third rows are non-selected.

At point-in-time t3, the driving signal PT_1 is at a high level. Thus, in the pixel 1 included in the topmost row in FIG. 1, the charge accumulated in the photoelectric converter 101 is transferred to the gate of the first transistor 102. The voltage at the gate of the first transistor 102 changes according to the amount of transferred charge. For example, if the transferred charge is electrons, the voltage at the gate of the first transistor 102 is lower. Thus, the voltage at the gate of the first transistor 102 is lower than the voltage at the gate of the second transistor 301. Subsequently, the driving signal PT is at a low level.

At point-in-time t4, the ramp signal VRMP is output. That is to say, the voltage output by the reference signal output unit 8 begins to change from the initial values. Correspondingly thereto, the counter 904 of the AD converter 9 begins counting.

At the point in time of point-in-time t4, the voltage at the gate of the second transistor 301 is higher than the voltage at the gate of the first transistor 102, as described above. Now, according to some embodiments, the ramp signal VRMP changes from higher voltage to lower voltage. Therefore, with the passing of time the voltage at the gate of the second transistor 301 becomes lower than the voltage at the gate of the first transistor 102. That is to say, the size relation of the voltage at the gate of the first transistor 102 and the voltage at the gate of the second transistor 301 is inverted.

The time from the change beginning in the ramp signal VRMP until the voltage size relation is inverted corresponds to the amount of transferred charge. Accordingly, corresponding to the ramp signal VRMP starting to change, the counter 904 begins counting, whereby the digital value corresponding to the amount of transferred charge can be obtained. Specifically, the latch pulse generating unit 901 outputs a latch pulse at the timing when the voltage size relation is inverted. The latch pulse is input into the S-latch circuit 903, and the S-latch circuit 903 holds the count value at the point in time that the latch pulse is input.

Subsequently, the count values held by the memory unit (N-latch circuit 902, S-latch circuit 903) in each pixel column are read out sequentially to the output unit 10 by the horizontal scanning circuit 12. The readout from the memory unit is performed during the readout time period for the second row (point-in-time t5 to point-in-time t9 in FIG. 3). Alternatively, the readout from the memory unit may be performed before the time (point-in-time t5) of starting readout of the next row.

Next, the signal of the pixel 1 in the row second from the top in FIG. 1 is read out during the time period from point-in-time t5 to point-in-time t9. The signal of the pixel 1 in the row third from the top in FIG. 1 is read out during the time period from point-in-time t9 to point-in-time t13.

At point-in-time t5, the pixel 1 included in the first and third rows from the top are non-selected. At point-in-time t6, the voltage of the gate of the first transistor 102 and the voltage of the gate of the second transistor 301 included in the pixel 1 in the second row from the top are reset. From the operations at point-in-time t5 and the operations at point-in-time t6, the pixels included in the second row from the top of FIG. 1 are selected, and the pixels included in the first and third rows are non-selected. Next, at point-in-time t7, in the pixel 1 in the second row from the top, the charge is transferred from the photoelectric converter 101 to the gate of the first transistor 102. At point-in-time t8, a comparison with the ramp signal VRMP is started.

At point-in-time t9, the pixels 1 included in the first and second rows from the top are non-selected. Also, at point-in-time t10, the voltage of the gate of the first transistor 102 and the voltage of the gate of the second transistor 301 included in the pixel 1 in the third row from the top are reset. From the operations at point-in-time t9 and the operations at point-in-time t10, the pixels included in the third row from the top of FIG. 1 are selected, and the pixels included in the first and second rows are non-selected. Next, at point-in-time t11, in the pixel 1 in the third row from the top, the charge is transferred from the photoelectric converter 101 to the gate of the first transistor 102. At point-in-time t12, a comparison with the ramp signal VRMP is started.

Note that according to some embodiments, a slope-type AD conversion is performed, which compares the signal from the photoelectric converter 101 and the ramp signal VRMP. However, the AD conversion method is not limited to a slope-type. Other AD conversion types may be used.

In FIG. 3, when the driving signal PRD is at a high level, the selecting transistors 104 in all of the pixels 1 may be turned on. That is to say, at points-in-time t1, t5, and t9, the driving signals PR1_1, PR1_2, and PR1_3 may be at high levels. Particularly, in the case that the first voltage supplying unit 5 is a circuit such as that illustrated in FIG. 2C, it is favorable for the selecting transistors 104 in all of the pixels 1 to be turned on.

Also, in FIG. 3, the timing to select a pixel 1 for comparison and the timing to non-select another pixel 1 may be switched with one another. Specifically, the driving signals at point-in-time t2 may be supplied earlier than point-in-time t1. As described above, the gate of the first transistor 102 can be floated. Therefore, either the operation to supply the first voltage to the gate of the first transistor 102 of the pixel 1 to be non-selected or the operation to supply the second voltage to the gate of the first transistor 102 of the pixel 1 to be selected may be performed first.

When the charge amount to be transferred at point-in-time t3 is large, there are cases where the first transistor 102 that had been turned on will turn off. In this case, the first transistor 102 of another pixel 1 that had been turned off may be turned on. With such operations, the voltage of the input node of the comparator can be clipped.

Also, a signal that is output at a state where the pixel 1 has been reset, and a signal that is output after the charge is transferred at the pixel 1, may be read out. Specifically, AD conversion may be performed for a signal of the pixel 1 when the voltage of the gate of the first transistor 102 is at a reset voltage, at the time between point-in-time t2 and point-in-time t3. According to such operations, influence from heat noise or the like that is generated when the transistor supplying the second voltage is turned off can be reduced.

As described above, with an imaging device according to some embodiments, a pixel includes a selecting unit, and the selecting unit supplies the gate of the first transistor with the first voltage which turns off the first transistor. According to such a configuration, resistance of the electrical pathway that includes the first transistor can be reduced. Consequently, the imaging device can be driven at a high speed.

Also, according to some embodiments, the selecting unit includes a selecting transistor that connects the first node and the gate of the first transistor. The first voltage which turns off the first transistor and the second voltage which turns on the first transistor are supplied from the first node. According to such a configuration, a separate wiring to supply the first voltage or second voltage to the pixel does not have to be arrayed, whereby the number of wirings can be reduced. Consequently, the aperture ratio of the pixel can be improved. Note that by omitting the transfer transistor, the aperture of the pixel can be further enlarged.

Also, according to some embodiments, the first voltage that turns off the first transistor and the second voltage that turns on the first transistor are supplied via the selecting transistor, whereby the number of pixel transistors can be reduced. Consequently, the area on a pixel covered by photoelectric converters can be increased. Note that by omitting the transfer transistor, the ratio of area covered by photoelectric converters can be increased further.

Second Embodiment

Figure 4A:
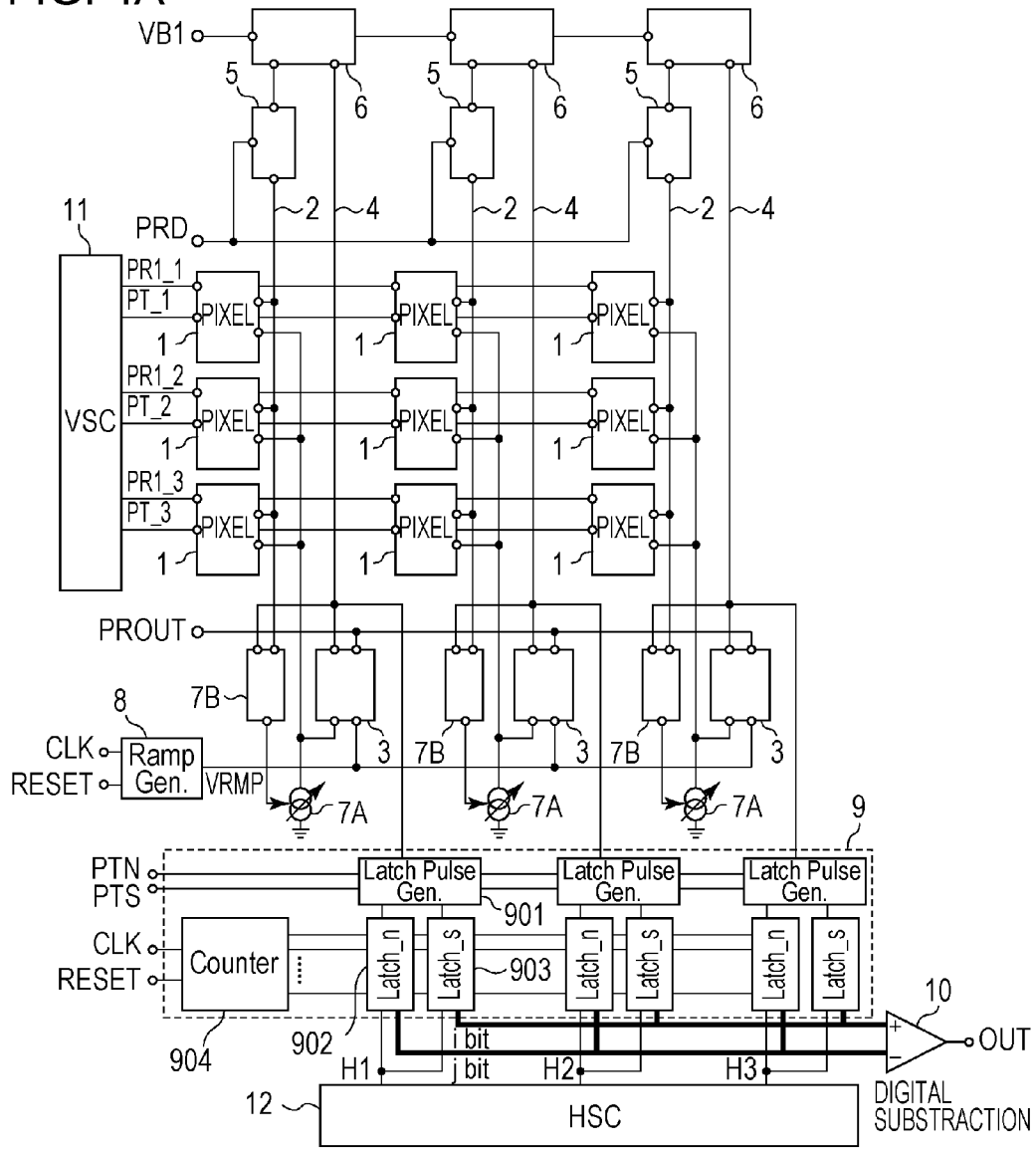
FIG. 4A is a block diagram illustrating a configuration of an imaging device according to the embodiment.

Another embodiment according to the disclosure will be described. A circuit configuration according to some embodiments is illustrated in FIG. 4A. In FIG. 4A, portions having functions similar to FIG. 1 are denoted by the same reference numerals. According to some embodiments, the power source unit 6 is a circuit including a current source.

An imaging device according to some embodiments has multiple pixels 1, first node 2, circuit unit 3 that includes second transistor, second node 4, first voltage supplying unit 5, power source unit 6, current source 7A, feedback unit 7B, reference signal output unit 8, AD converter 9, output unit 10, vertical scanning circuit 11, and horizontal scanning circuit 12.

The first transistor included in the pixel 1 and the second transistor included in the circuit unit 3 define, or constitute, a differential pair. The second transistors are disposed at the ratio of one as to multiple pixels. Also, the comparator which the imaging device according to some embodiments has is configured to include a first transistor and second transistor. Each of the multiple pixels 1 includes a selecting unit that turns off the first transistor with the voltage applied to the gate of the first transistor.

According to the present embodiment, the power source unit 6 and current source 7A differ from the first embodiment. Thus, only the portions of the present embodiment that differ from the first embodiment will be described. The other portions are similar to the first embodiment.

Figure 4B:
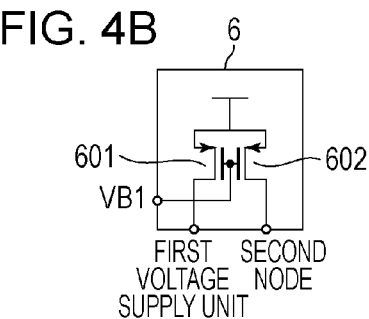
FIGS. 4B and 4C are circuit diagrams thereof.

A specific circuit configuration of the power source unit 6 according to some embodiments is illustrated in FIG. 4B. The power source unit 6 includes the third transistor 601 and the fourth transistor 602. The third transistor 601 and fourth transistor 602 are both P-channel-type MOS transistors.

The source of the third transistor 601 is connected to the power node VDD to which current voltage is supplied. The drain of the third transistor 601 is connected to the first voltage supplying unit 5. The source of the fourth transistor 602 is connected to the power node VDD. The drain of the fourth transistor 601 is connected to the second node 4.

The gate of the third transistor 601 and the gate of the fourth transistor 602 are mutually connected. According to some embodiments, the bias voltage VB1 is supplied to the gate of the third transistor 601 and the gate of the fourth transistor 602. That is to say, the third transistor 601 and fourth transistor 602 each defines, or constitute, a current source.

Also, according to some embodiments, the current value of the current source 7A is variable. Thus, bias current of a differential pair can be changed according to the value of the bias voltage VB1. The feedback unit 7B controls the current value of the current source 7A based on the voltage of the first node 2 and second node 4. For example, the current value of the current source 7A is controlled so that the first node 2 and second node 4 have a predetermined voltage (e.g. a voltage between the current voltage and grounding voltage) at the time of resetting.

Figure 4C:
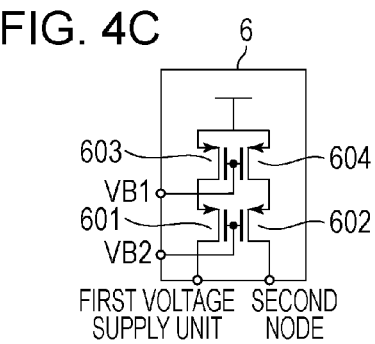

FIG. 4B illustrates a configuration where just the current source is disposed. However, as illustrated in FIG. 4C, the gate ground amplifying circuit may be configured so as to be connected to the current source by cascode connection. In FIG. 4C, the third transistor 601 and fifth transistor 603 are connected by cascode connection. Also, the fourth transistor 602 and the sixth transistor 604 are connected by cascode connection.

The driving method according to the present embodiment is similar to the first embodiment. That is to say, the imaging device according to the present embodiment may operate based on the driving signals illustrated in FIG. 3. A signal output in the state of the pixel 1 having been reset, and a signal output after the charge is transferred in the pixel 1, may also be read out.

With the imaging device according to some embodiments, the pixel includes a selecting unit, and the selecting unit supplies the gate of the first transistor with the first voltage which turns off the first transistor. According to such a configuration, the resistance of the current pathway that includes the first transistor can be made smaller. Consequently, the imaging device can be driven at a high speed.

Also, with a configuration according to some embodiments, a full differential amplification where the first node 2 and second node 4 are the output nodes can be made. Thus, the oscillation of the signal expressing the comparison results can be increased, whereby more precise comparison operations can be performed.

Third Embodiment

Figure 5A:
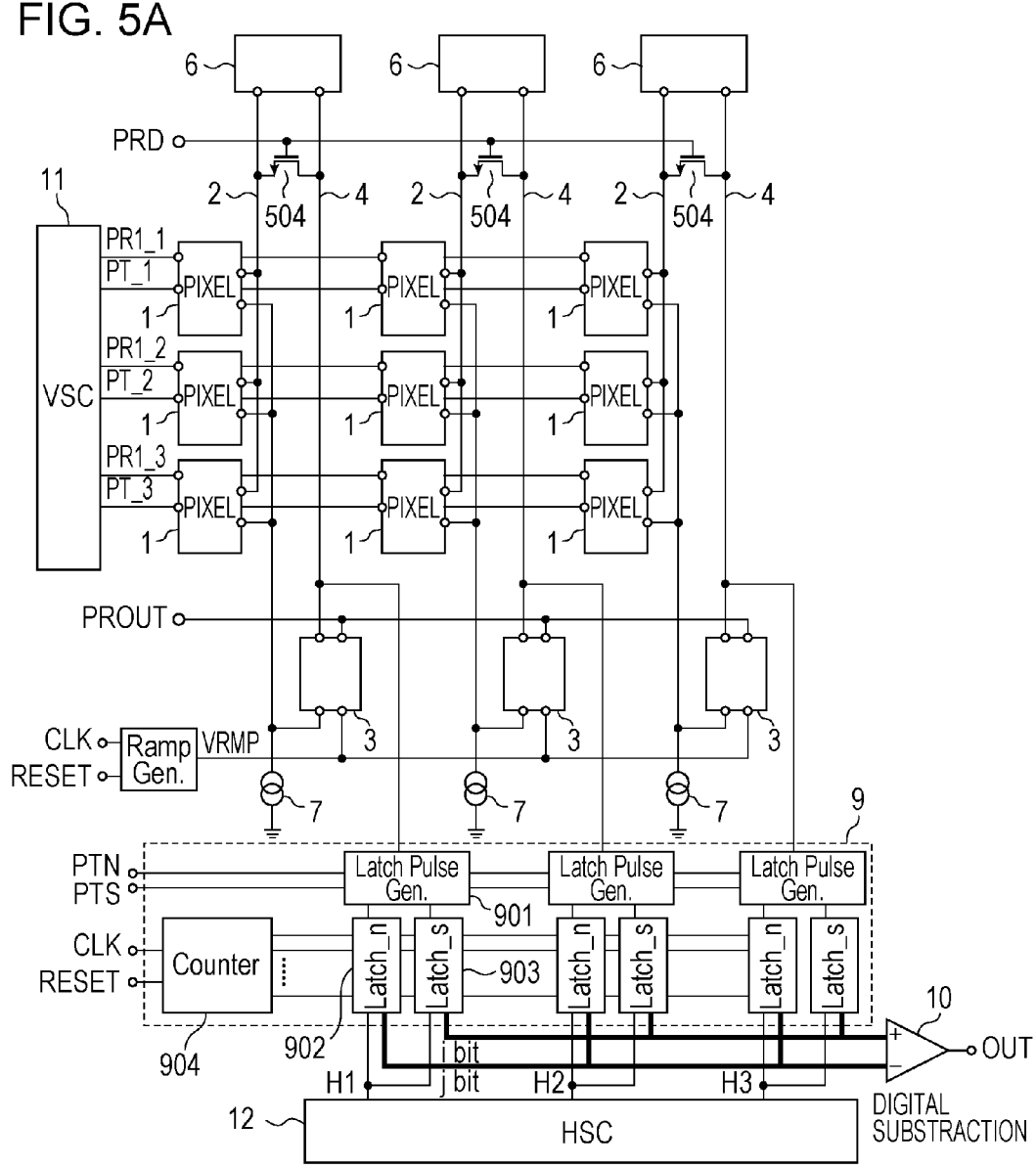
FIG. 5A is a block diagram illustrating a configuration of an imaging device according to the embodiment.

Another embodiment according to the disclosure will be described. A circuit configuration according to some embodiments is illustrated in FIG. 5A. In FIG. 5A, portions having similar functions as FIG. 1 are denoted with the same reference numerals. According to some embodiments, a voltage is output by the reference signal output unit that causes the pixel to be non-selected.

An imaging device according to some embodiments has multiple pixels 1, a first node 2, circuit unit 3 that includes a second transistor, second node 4, power source unit 6, current source 7, reference signal output unit 8, AD converter 9, output unit 10, vertical scanning circuit 11, and horizontal scanning circuit 12.

The first transistor included in the pixel 1 and the second transistor included in the circuit unit 3 define, or constitute, a differential pair. The second transistors are disposed at the ratio of one as to multiple pixels. Also, the comparator which the imaging device according to some embodiments has is configured to include a first transistor and second transistor. Each of the multiple pixels 1 includes a selecting unit that turns off the first transistor with the voltage applied to the gate of the first transistor.

The present embodiment differs from the first embodiment in that the first voltage supplying unit 5 is omitted. According to the present embodiment, a transistor 504 that controls the electrical connections between the first node 2 and the second node 4 is provided. The configuration of the circuit unit 3 that includes the second transistor in to the present embodiment differs from the first embodiment. Thus, only the portions of the present embodiment that differs from the first embodiment will be described. Other portions are similar to the first embodiment. The power source unit 6 according to the present embodiment may be in a circuit configuration such as that shown in FIG. 4B or 4C, similar to the second embodiment.

As illustrated in FIG. 5A, the transistor 504 is disposed in the pathway between the first node 2 and the second node 4. The transistor 504 is an N-channel-type MOS transistor. The driving signal PRD is supplied to the gate of the transistor 504.

Figure 5B:
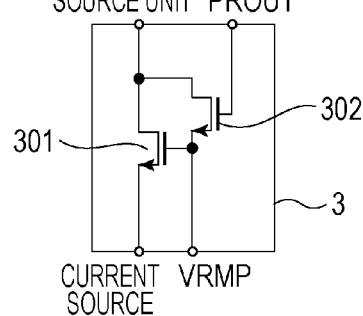
FIG. 5B is a circuit diagram thereof.

A specific circuit configuration of the circuit unit 3 is illustrated in FIG. 5B. The circuit unit 3 includes a second transistor 301 and connecting transistor 302. The second transistor 301 and connecting transistor 302 are both N-channel-type MOS transistors.

The drain of the second transistor 301 is connected to the second node 4. The second node 4 is connected to the drain of the fourth transistor 602 of the power source unit 6. The source of the second transistor 301 is connected to the current source 7. The drain of the connecting transistor 302 is connected to the second node 4. The source of the connecting transistor 302 is connected to the gate of the second transistor 301. The gate of the second transistor 301 is connected to the output node of the reference signal output unit 8.

Next, operations to select or non-select a pixel 1 according to some embodiments will be described. At the time that the first voltage which turns off the first transistor is supplied to the first node 2, the pixel 1 can be non-selected by the selecting transistor 104 of the pixel 1 being turned on. On the other hand, at the time that the second voltage which turns on the first transistor is supplied to the first node 2, the pixel 1 can be selected by the selecting transistor 104 of the pixel 1 being turned on. These points are similar to the first embodiment.

According to some embodiments, the reference signal output unit 8 supplies the first voltage which turns off the first transistor 102 to the first node 2. Specifically, the connecting transistor 302 and transistor 504 are turned on, based on the driving signals PROUT and PRD from the vertical scanning circuit 11. At the time that the connecting transistor 302 and transistor 504 are turned on, the reference signal output unit 8 outputs the first voltage. Thus, the first voltage is supplied to the first node 2 via the connecting transistor 302 and transistor 504.

At the time of selecting a pixel 1, the transistor 504 is turned off and the selecting transistor 104 is turned on. Thus, the second voltage which turns on the first transistor 102 is supplied to the gate of the first transistor 102 by the power source unit 6. Note that at the time of selecting the pixel 1, the connecting transistor 302 may be turned on. According to such operations, the voltage at the gate of the first transistor 102 and the voltage at the gate of the second transistor 301 can be reset to approximately the same voltage.

Alternatively, in the case of selecting the pixel 1, when the selecting transistor 104, transistor 504, and connecting transistor 302 are turned on, the reference signal output unit 8 may output the second voltage. According to such operations, the voltage at the gate of the first transistor 102 and the voltage at the gate of the second transistor 301 can be reset to approximately the same voltage. Additionally, the voltage at the gates when reset can be an optional voltage output by the reference signal output unit 8.

An imaging device according to some embodiments may operate based on the driving signals illustrated in FIG. 6. In FIG. 6, the driving signal PROUT and the ramp signal VRMP differ from FIG. 3. The other driving pulses in FIG. 6 are similar to FIG. 3. However, the driving signal PRD in FIG. 6 is supplied to the gate of the transistor 504.

Specifically, during a period when the driving pulse PRD is at a high level (point-in-time t1), the driving signal PROUT is at a high level, and the reference signal VRMP is the first voltage. Therefore, the reference signal output unit 8 supplies the first voltage to the first node 2 via the connecting transistor 302 and transistor 504. According to such operations, the first voltage is applied to the control node of the first transistor 102. According to some embodiments, the first voltage may be the minimal voltage of the ramp signal VRMP. Subsequently, at point-in-time t2, the output of the ramp signal VRMP is reset to the initial values thereof.

The other operations are similar to the first embodiment, so the descriptions thereof will be omitted. Note that in FIG. 6, when the driving signal PRD is at a high level, the selecting transistors 104 of all of the pixels 1 may be turned on. Also, a signal that is output in a state of the pixel 1 having been reset, and a signal that is output after the charge in the pixel 1 has been transferred, may be subjected to AD conversion. Specifically, AD conversion may be performed between point-in-time t2 and point-in-time t3. According to such operations, influence from heat noise or the like that is generated when the transistor supplying the second voltage is turned off can be reduced.

In an imaging device according to some embodiments, a pixel includes a selecting unit, and the selecting unit supplies the gate of the first transistor with the first voltage which turns off the first transistor. According to such a configuration, resistance of the electrical pathway that includes the first transistor can be reduced. Consequently, the imaging device can be driven at a high speed.

Also, according to some embodiments, the voltage output by the reference signal output unit 8 can be supplied to the gate of the first transistor. According to such a configuration, the voltage at the gate of the first transistor and the voltage at the gate of the second transistor may be roughly equal. Thus, the capacitance connected to the gate of the second transistor can be omitted, and the reduction in comparison precision from processing unevenness can be reduced.

Fourth Embodiment

Figure 7:
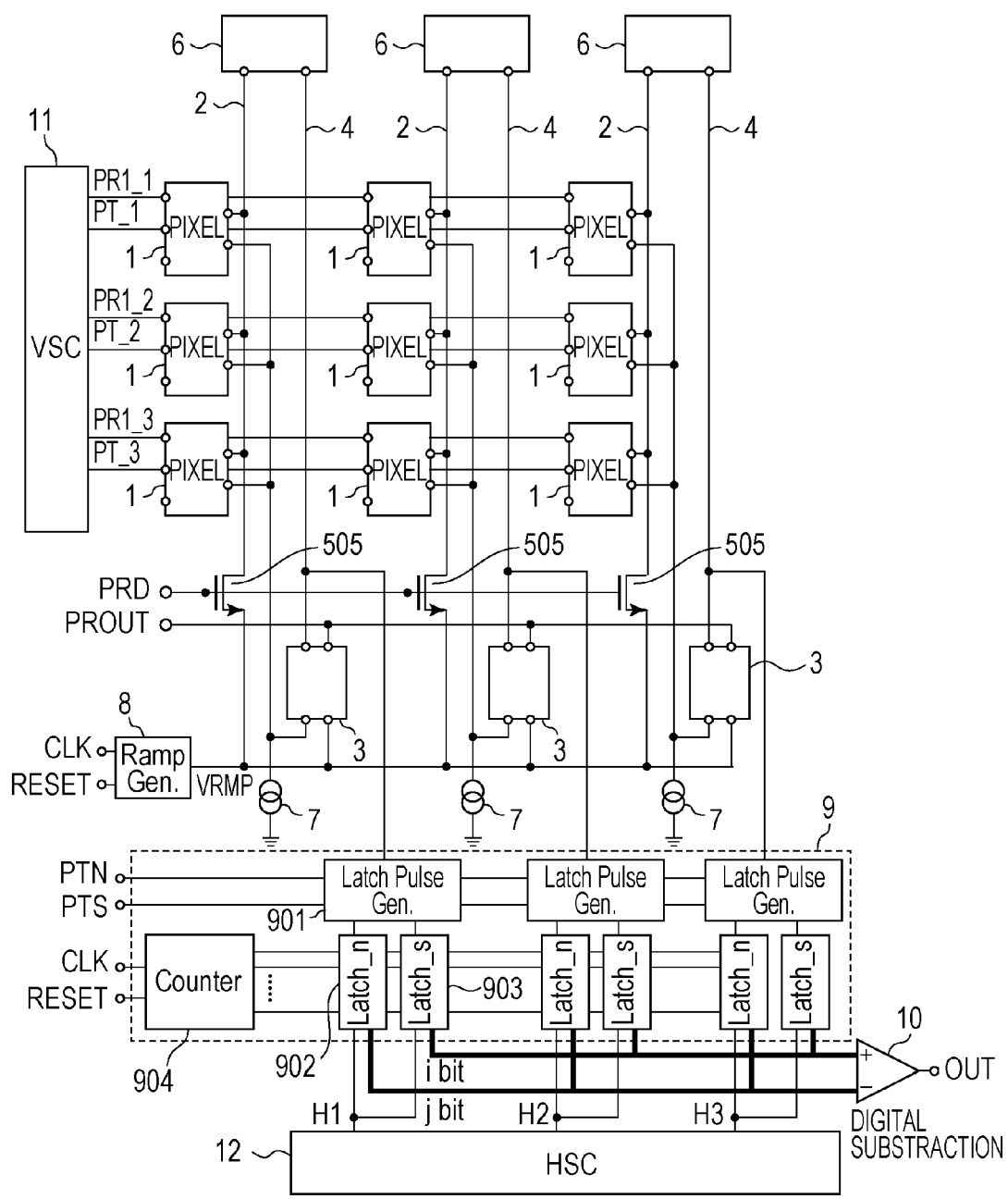
FIG. 7 is a block diagram illustrating a configuration of an imaging device according to the embodiment.

Another embodiment according to the disclosure will be described. A circuit configuration according to some embodiments is illustrated in FIG. 7. In FIG. 7, portions having similar functions as FIG. 1 are denoted by the same reference numerals. According to some embodiments, the reference signal output unit can output voltage which causes a pixel to be non-selected.

The imaging device according to some embodiments have multiple pixels 1, a first node 2, circuit unit 3 that includes a second transistor, second node 4, power source unit 6, current source 7, reference signal output unit 8, AD converter 9, output unit 10, vertical scanning circuit 11, and horizontal scanning circuit 12.

The first transistor included in the pixel 1 and the second transistor included in the circuit unit 3 define, or constitute, a differential pair. The second transistors are disposed in the ratio of one as to multiple pixels. Also, the comparator which the imaging device according to some embodiments has is configured to include a first transistor and second transistor. Each of the multiple pixels 1 includes a selecting unit that turns off the first transistor with the voltage applied to the gate of the first transistor.

The present embodiment differs from the first embodiment in that the first voltage supplying unit 5 is omitted. Also, according to the present embodiment, a transistor 505 that controls the electrical connection between the first node 2 and the output node of the reference signal output unit 8 is provided. Now, just the portions of the present embodiment that differ from the first embodiment will be described. The other portions are similar to the first embodiment. Note that the power source unit 6 according to some embodiments may have a circuit configuration such as those illustrated in FIG. 4B or 4C, similar to the second embodiment. Also, the circuit unit 3 may have a circuit configuration such as that illustrated in FIG. 5B, similar to the third embodiment.

According to some embodiments, the transistor 505 is disposed in the electrical pathway between the first node 2 and the output node of the reference signal output unit 8, as illustrated in FIG. 7A. The transistor 505 is an N-channel-type MOS transistor. The driving signal PRD is supplied to the gate of the transistor 505.

Next, operations to select or non-select a pixel 1 according to some embodiments will be described. When the first voltage which turns off the first transistor is supplied to the first node 2, the pixel 1 can be non-selected by the selecting transistor 104 of the pixel 1 being turned on. On the other hand, when the second voltage which turns on the first transistor is supplied to the first node 2, the pixel 1 can be selected by the selecting transistor 104 of the pixel 1 being turned on. These points are similar to the first embodiment.

According to some embodiments, the reference signal output unit 8 supplies the first voltage which turns off the first transistor 102 to the first node 2. Specifically, the transistor 505 is turned on based on the driving signal PRD from the vertical scanning circuit 11. When the transistor 505 is turned on, the reference signal output unit 8 outputs the first voltage. Therefore, the first voltage is supplied to the first node 2 via the transistor 505.

When selecting a pixel 1, the transistor 505 is turned off, and the selecting transistor 104 is turned on. Thus, the second voltage which turns on the first transistor 102 is supplied to the gate of the first transistor 102 from the power source unit 6.

Alternatively, when selecting the pixel 1, the reference signal output unit 8 may output the second voltage when the selecting transistor 104 and transistor 505 are turned on. According to such operations, the voltage of the gate of the first transistor 102 and the voltage of the gate of the second transistor 301 can be reset to roughly the same voltage. Additionally, the voltage at the gate when being reset can be an optional voltage output by the reference signal output unit 8.

The driving method according to the present embodiment is similar to the third embodiment. That is to say, the imaging device according to the present embodiment may operate based on the driving signals illustrated in FIG. 6. However, the driving signal PRD in FIG. 6 is supplied to the gate of the transistor 505. Also, a signal output which in a state of the pixel 1 being reset, and a signal output after the charge in the pixel 1 is transferred, may be read out. Specifically, AD conversion may be performed between point-in-time t2 and point-in-time t3. According to such operations, influence from heat noise or the like that is generated when the transistor supplying the second voltage is turned off can be reduced.

In an imaging device according to some embodiments, a pixel includes a selecting unit, and the selecting unit supplies the gate of the first transistor with the first voltage which turns off the first transistor. According to such a configuration, resistance of the electrical pathway that includes the first transistor can be reduced. Consequently, the imaging device can be driven at a high speed.

Also, according to some embodiments, the voltage output by the reference signal output unit 8 can be supplied to the gate of the first transistor. According to such a configuration, the voltage at the gate of the first transistor and the voltage at the gate of the second transistor may be roughly equal. Thus, the capacitance that is connected to the gate of the second transistor and the connecting transistor that connects the gate and drain of the second transistor can be omitted. Therefore, the scope of the circuit can be minimized. Alternatively, the reduction in comparison precision from processing unevenness can be reduced.

Fifth Embodiment

Figure 8A:
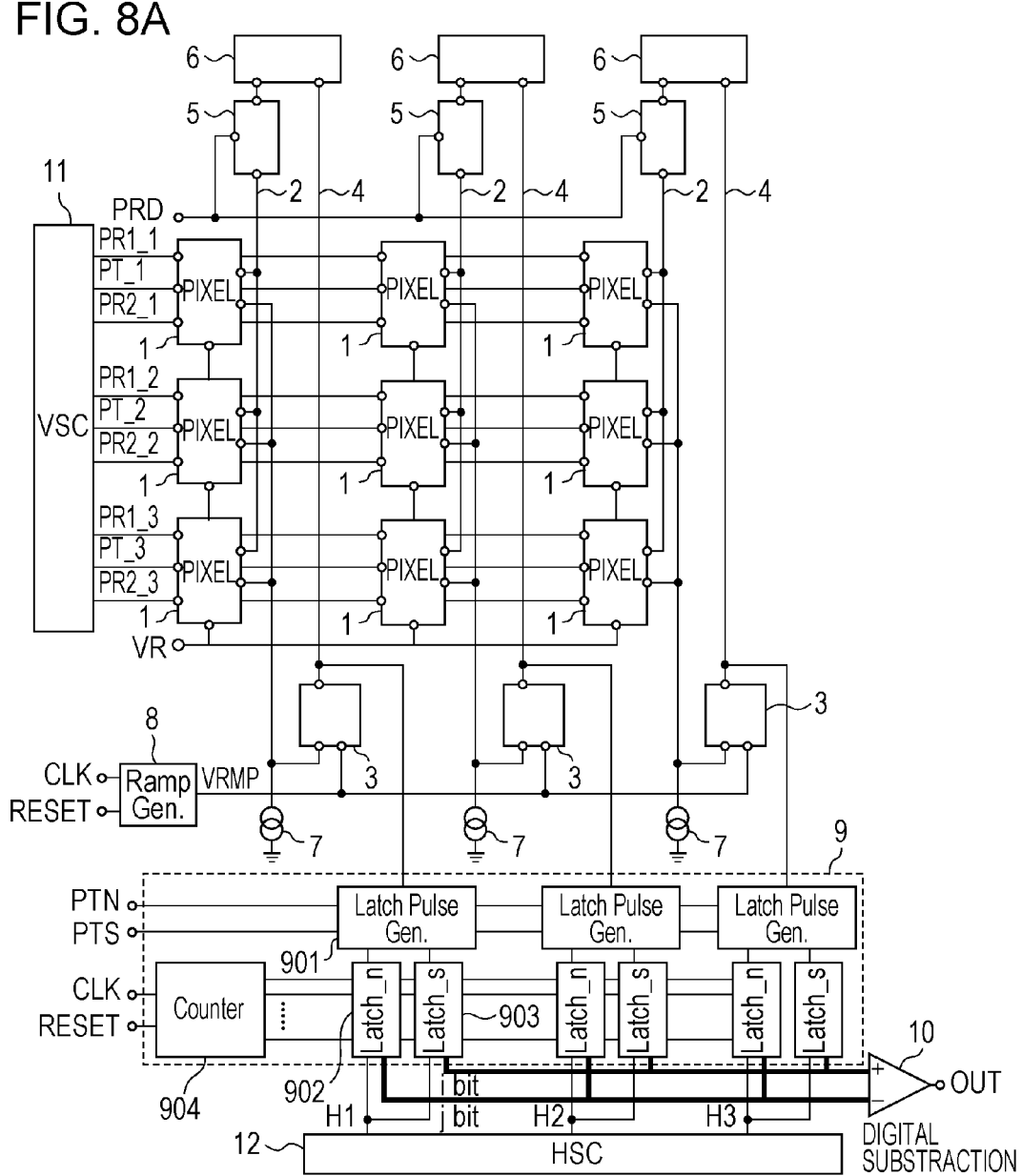
FIG. 8A is a block diagram illustrating a configuration of an imaging device according to the embodiment.

Another embodiment according to the disclosure will be described. A circuit configuration according to some embodiments is illustrated in FIG. 8A. In FIG. 8A, portions having similar functions to FIG. 1 are denoted by the same reference numerals. According to some embodiments, the second voltage which selects the pixel is supplied via the reset transistor of the pixel.

The imaging device according to some embodiments has multiple pixels 1, a first node 2, circuit unit 3 that includes a second transistor, second node 4, first voltage supplying unit 5, power source unit 6, current source 7, reference signal output unit 8, AD converter 9, output unit 10, vertical scanning circuit 11, and horizontal scanning circuit 12.

The first transistor included in the pixel 1 and the second transistor included in the circuit unit 3 define, or constitute, a differential pair. The second transistors are disposed at the ratio of one as to multiple pixels. Also, the comparator which the imaging device according to some embodiments has is configured to include a first transistor and second transistor. Each of the multiple pixels 1 includes a selecting unit that turns off the first transistor with the voltage applied to the gate of the first transistor.

The present embodiment differs from the first embodiment in the configuration of the pixel 1. Thus, just portions of the present embodiment that differ from the first embodiment will be described. The other portions are similar to the first embodiment. Note that the power source unit 6 according to some embodiments may have a circuit configuration such as those illustrated in FIG. 4B or 4C, similar to the second embodiment. Also, the circuit unit 3 may have a circuit configuration such as that illustrated in FIG. 5B, similar to the third embodiment.

Figure 8B:
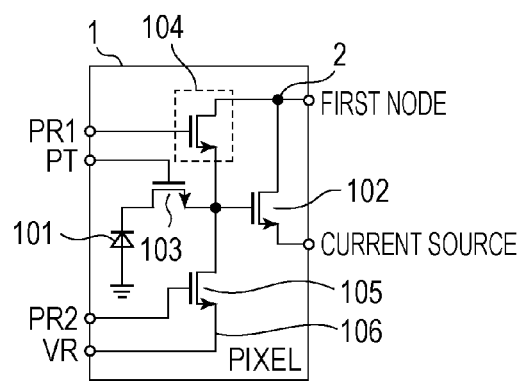
FIG. 8B is a circuit diagram thereof.

FIG. 8B illustrates a circuit configuration of a pixel 1 according to some embodiments. Similar to the first embodiment, the pixel 1 includes a photoelectric converter 101, first transistor 102, transfer transistor 103, and selecting transistor 104. Further, the pixel 1 according to some embodiments includes a reset transistor 105. The portions of the pixel 1 other than the reset transistor 105 are similar to the first embodiment.

The reset transistor 105 is an N-channel-type MOS transistor. The drain of the reset transistor 105 is connected to the second voltage node 106 supplying the reset voltage VR. The reset voltage VR is voltage that turns on the first transistor 102. That is to say, according to some embodiments, the second voltage is the reset voltage VR. For example, the reset voltage VR may be the same as the current voltage. The source of the reset transistor 105 is connected to the gate of the first transistor 102. The driving signal PR2 is supplied to the gate of the reset transistor 105. The reset transistor 105 is controlled on and off by the driving signal PR2. The vertical scanning circuit 11 may supply the driving signal PR2.

Operations to select a pixel 1 in such a configuration will be described. The second voltage is applied to the gate of the first transistor 102 by the reset transistor 105 being turned on. Thus, the first transistor 102 is turned on.

The driving method according to some embodiments is similar to the first embodiment. That is to say, the imaging device according to some embodiments may operate based on the driving signals illustrated in FIG. 3. However, at point-in-time t2 in FIG. 3, the driving signal PR2_1 that is supplied to the pixels 1 in the topmost row in FIG. 8A is at a high level. Also, at point-in-time t6, the driving signal PR2_2 that is supplied to the pixels 1 in the second row from the top in FIG. 8A are at a high level. Also, at point-in-time t10, the driving signal PR2_3 that is supplied to the pixels 1 in the third row from the top in FIG. 8A is at a high level. Note that at point-in-time t2, the driving signal PR1_1 may be at a high level, or the driving signal PR1_1 may be maintained at a low level. Also, a signal that is output at a state where the pixel 1 has been reset, and a signal that is output after the charge is transferred at the pixel 1, may be read out. Specifically, AD conversion may be performed between point-in-time t1 and point-in-time t2. According to such operations, influence from heat noise or the like that is generated when the reset transistor 105 supplying the second voltage is turned off can be reduced.

In an imaging device according to some embodiments, a pixel includes a selecting unit, and the selecting unit supplies the gate of the first transistor with the first voltage which turns off the first transistor. According to such a configuration, resistance of the electrical pathway that includes the first transistor can be reduced. Consequently, the imaging device can be driven at a high speed.

Also, according to some embodiments, in the case of the reference signal output unit 8 outputting the ramp signal VRMP, the voltage at the gate of the first transistor and the voltage at the gate of the second transistor can be roughly equal, by setting the initial value of the ramp signal VRMP as the second voltage. Thus, The connecting transistor that is disposed between the gate and source of the second transistor and the capacitance that is connected to the gate of the second transistor can be omitted, and the scope of the circuit can be reduced.

Also, according to some embodiments, the electrical pathway that supplies the first voltage and the electrical pathway that supplies the second voltage differ from one another. Therefore, selecting a pixel 1, and non-selecting a different pixel 1 from the pixel 1 selected can be performed concurrently. Consequently, the imaging device can be driven at a high speed.

Sixth Embodiment

Figure 9A:
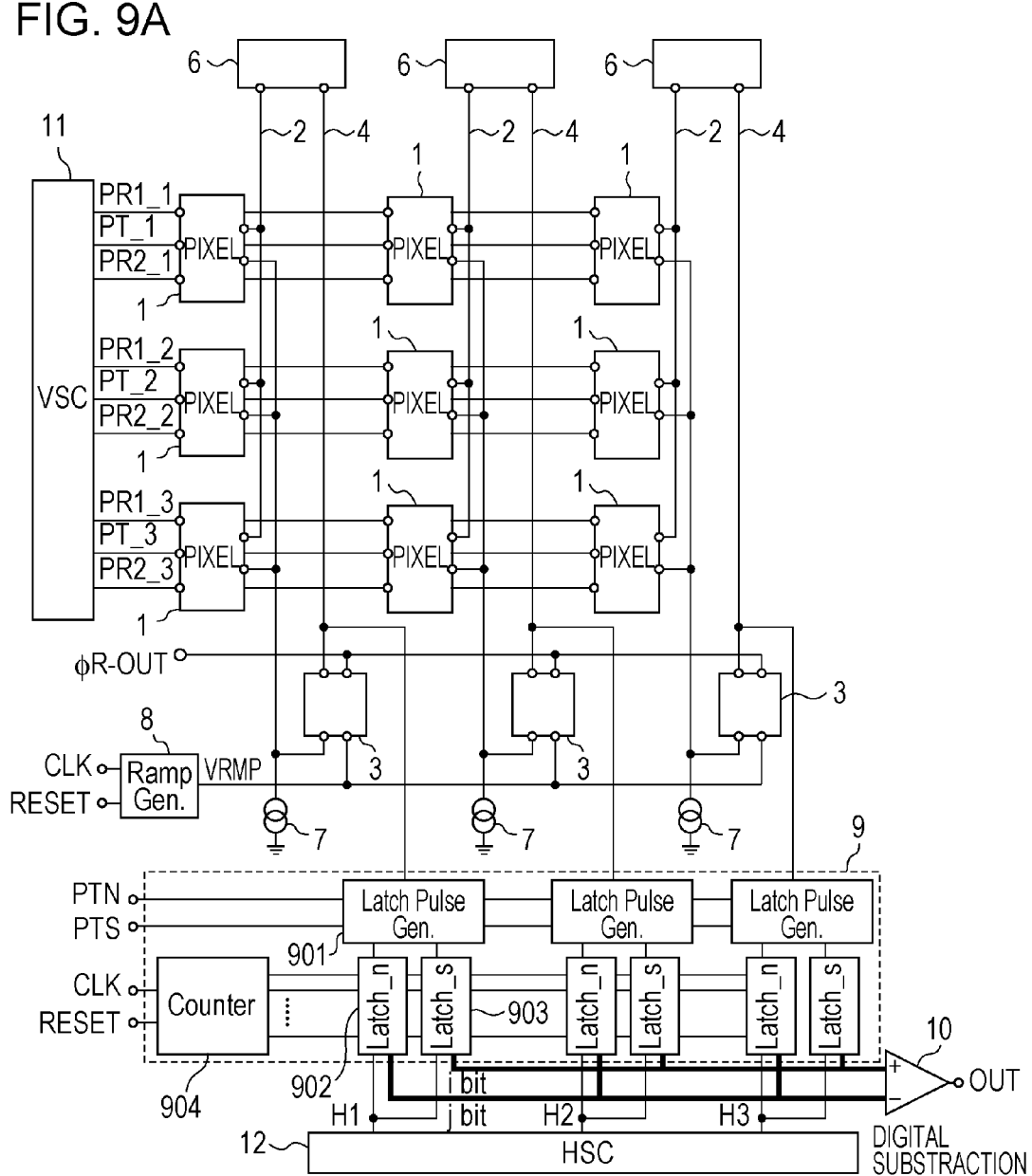
FIG. 9A is a block diagram illustrating a configuration of an imaging device according to the embodiment.

Another embodiment according to the disclosure will be described. A circuit configuration according to some embodiments is illustrated in FIG. 9A. In FIG. 9A, portions having similar functions as in FIG. 1 are denoted by the same reference numerals. According to some embodiments, a node to which the first voltage that non-selects a pixel is supplied is disposed on a pixel.

An imaging device according to some embodiments has multiple pixels 1, a first node 2, circuit 3 that includes a second transistor, second node 4, power source unit 6, current source 7, reference signal output unit 8, AD converter 9, output unit 10, vertical scanning circuit 11, and horizontal scanning circuit 12.

The first transistor included in the pixel 1 and the second transistor included in the circuit unit 3 define, or constitute, a differential pair. The second transistors are disposed at the ratio of one as to multiple pixels. Also, the comparator which the imaging device according to some embodiments has is configured to include a first transistor and second transistor. Each of the multiple pixels 1 includes a selecting unit that turns off the first transistor with the voltage applied to the gate of the first transistor.

According to some embodiments, the configuration of the pixel 1 differs from the first embodiment. Also, according to some embodiments, the first voltage supplying unit 5 in the first embodiment is omitted. Thus, just portions in some embodiments that differ from the first embodiment will be described. The other portions are similar to the first embodiment. Note that the power source unit 6 according to some embodiments may have a circuit configuration such as those illustrated in FIG. 4B or 4C, similar to the second embodiment. Also, the circuit unit 3 may have a circuit configuration such as that illustrated in FIG. 5B, similar to the third embodiment.

Figure 9B:
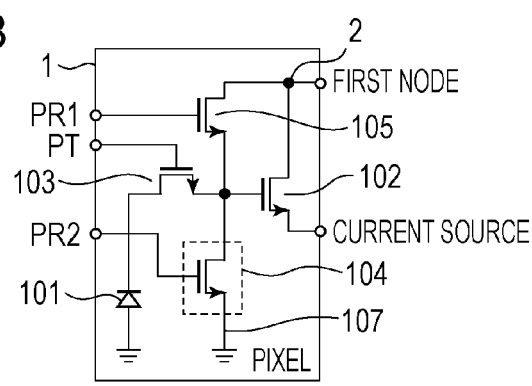
FIG. 9B is a circuit diagram thereof.

FIG. 9B illustrates a circuit configuration of a pixel 1 according to some embodiments. Similar to the first embodiment, the pixel 1 includes a photoelectric converter 101, first transistor 102, and transfer transistor 103. Further, the pixel 1 according to some embodiments includes a selecting transistor 104 and reset transistor 105. The selecting transistor 104 makes up the selecting unit. Also, a first voltage node 107 to which the first voltage that turns off the first transistor 102 is supplied is provided.

The selecting transistor 104 is an N-channel-type MOS transistor. The drain of the selecting transistor 104 is connected to the gate of the first transistor 102. The source of the selecting transistor 104 is connected to the first voltage node 107. According to some embodiments, the first voltage is a grounding voltage. That is to say, the source of the selecting transistor is grounded. Not being limited to a grounding voltage, the first voltage only has to be lower than the second voltage that turns on the first transistor 102. More preferably, the first voltage is a voltage where the voltage between the gate and source of the first transistor 102 is lower than the threshold voltage of the first transistor 102. The first voltage node 107 according to some embodiments is made up of a semiconductor region. A portion of a semiconductor region making up the first voltage node 107 may define, or constitute, a photodiode (photoelectric converter 101). Alternatively, the first voltage node 107 may be made up of a semiconductor material such as metal.

The reset transistor 105 is an N-channel-type MOS transistor. The drain of the reset transistor 105 is connected to the drain of the first transistor 102. The source of the reset transistor 105 is connected to the gate of the first transistor 102. The drain of the first transistor 102 is connected to the first node 2, so the reset transistor 105 connects the gate of the first transistor 102 and the first node 2.

The driving signal PR2 is supplied from the vertical scanning circuit 11 to the gate of the selecting transistor 104. The driving signal PR1 is supplied from the vertical scanning circuit 11 to the gate of the reset transistor 105. The on/off of each transistor is controlled by the driving signals PR1 and PR2. That is to say, the vertical scanning circuit 11 is a control unit that controls the selecting transistor 104 and reset transistor 105. Note that the vertical scanning circuit 11 can supply the driving signals to the multiple pixels 1 included in the same pixel row, concurrently or in a synchronized manner. Also, the vertical scanning circuit 11 supplies mutually independent driving signals to the multiple pixels 1 that are included in different pixel rows.

Operations to select or non-select a pixel 1 according to such a configuration will be described. First, when selecting a pixel 1, the reset transistor 105 is turned on by the driving signal PR1. The second voltage is applied to the gate of the first transistor 102 from the power source unit 6 by the reset transistor 105 being turned on. Thus, the first transistor 102 is turned on. The gate of the first transistor 102 can be floated by the selecting transistor 104 and reset transistor 105 being turned off, whereby the second voltage is held at the gate. Next, when non-selecting a pixel 1, the selecting transistor 104 is turned on by the driving signal PR2. The first voltage is applied to the gate of the first transistor 102 from the first voltage node 107 by the selecting transistor 104 being turned on. Thus, the first transistor 102 is turned off. The gate of the first transistor 102 can be floated by the selecting transistor 104 and reset transistor 105 being turned off, whereby the first voltage is held at the gate.

Thus, according to some embodiments, the first voltage that non-selects a pixel 1 and the second voltage that selects a pixel 1 can be applied to the gate of the first transistor 102 by different electrical pathways. That is to say, the first voltage is applied to the gate of the first transistor 102 via the selecting transistor 104, and the second voltage is applied to the gate of the first transistor 102 via the reset transistor 105. According to such a configuration, the selection of the pixel 1 and the non-selection of a different pixel 1 can be performed concurrently. Consequently, the imaging device can be driven at a high speed.

Figure 10:
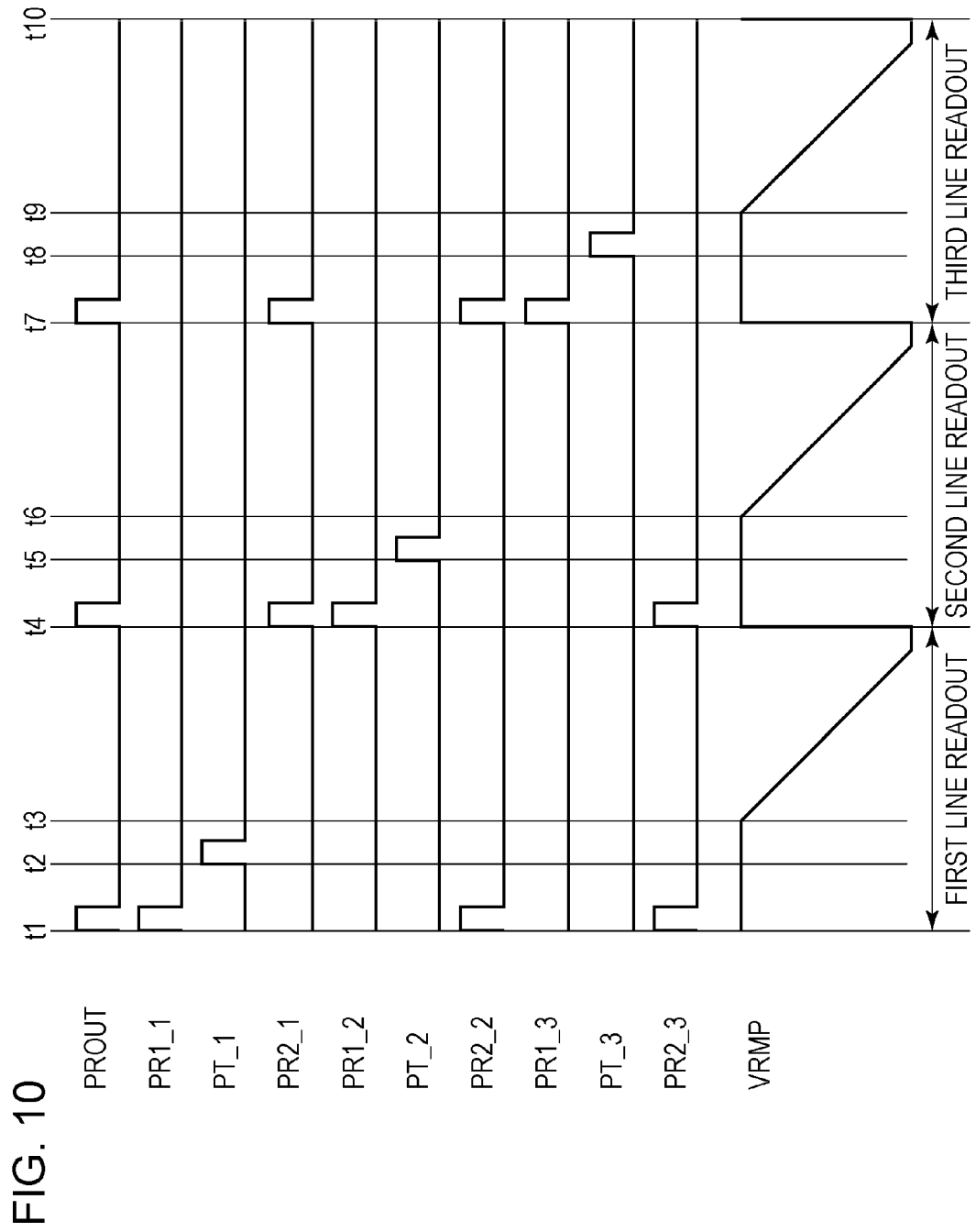
FIG. 10 is a diagram schematically illustrating a timing chart of a driving signal of an imaging device according to the embodiment.

Next, operations of an imaging device according to some embodiments will be described. FIG. 10 illustrates a timing chart of the driving signals and reference signal. The driving signal PROUT is supplied to the circuit unit 3 that includes the second transistor in FIG. 9A. Note that an example where the circuit unit 3 has a connecting transistor 302, as illustrated in FIG. 2E or 5B, is described. The driving signal PROUT is supplied to the gate of the connecting transistor 302. The driving signals PR1, PT, and PR2 are supplied to the gate of the reset transistor 105, gate of the transfer transistor 103, and the gate of the selecting transistor 104 in FIG. 9B, respectively. The ramp signal VRMP is a reference signal output by the reference signal output unit 8.

Now, operations to read out signals from nine pixels 1 that are arrayed so as to configure a matrix of three rows and three columns will be described. Driving signals are synchronized and supplied to the three pixels 1 included in one row. Therefore, the signals from three pixels 1 included in one row are read out serially. The readout by row is performed sequentially or randomly. For ease of description, a notation indicating the row number denotes the driving signals PR1, PT, and PR2. For example, in FIG. 10 the driving signal PR1_1 is supplied to the pixel 1 included in the row disposed at the topmost of the diagram of the three rows. The driving signal PR1_2 is supplied to the pixel 1 included in the row disposed at the second from the top of the diagram of the three rows.

In FIG. 10, a high level driving signal is the voltage that turns on the N-channel-type transistor. In the same diagram, a low level driving signal is the voltage that turns off the N-channel-type transistor. The high level driving signal is a power voltage, for example. The low level driving signal is a grounding voltage, for example.

First, the signal from the pixels 1 in the first row from the top of FIG. 9A is read out between the point-in-time t1 to the point-in-time t4 in FIG. 10.

At point-in-time t1, the driving signal PROUT, and driving signals PR1_1, PR2_2, and PR2_3 are at high levels. The other driving signals are at low levels. By the driving signal PR1_1 being at a high level, a pixel included in the topmost row in FIG. 9A is selected. That is to say, the second voltage is supplied to the gate of the first transistor 102. By the driving signals PR2_2 and PR2_3 being at high levels, the pixels 1 included in the second row from the top of FIG. 9A and the pixels 1 included in the third row from the top of FIG. 9A are non-selected. That is to say, the first voltage is supplied to the gate of the first transistor 102 of these pixels 1 that are disposed in the second and third rows from the top, via the selecting transistor 104. Also, the driving signals PR1_1 and PROUT are a high levels, whereby the voltage at the gate of the first transistor 102 and the voltage at the gate of the second transistor 301 become roughly equal. Thus, the voltage at the gate of the first transistor 102 and the voltage at the gate of the second transistor are reset. Subsequently, the driving signals PROUT, PR1_1, PR2_2, and PR2_3 become low level. Note that a point-in-time t1, the reference signal output unit 8 outputs the initial value of the ramp signal VRMP.

At point-in-time t2, the driving signal PT_1 is at a high level. Thus, in the pixel 1 included in the topmost row in FIG. 9A, the charge accumulated in the photoelectric converter 101 is transferred to the gate of the first transistor 102. The voltage at the gate of the first transistor 102 changes according to the amount of transferred charge. For example, if the transferred charge is electrons, the voltage at the gate of the first transistor 102 is lower. Thus, the voltage at the gate of the first transistor 102 is lower than the voltage at the gate of the second transistor 301. Subsequently, the driving signal PT is at a low level.

At point-in-time t3, the ramp signal VRMP is output. That is to say, the voltage output by the reference signal output unit 8 begins to change from the initial values. Corresponding thereto, the counter 904 of the AD converter 9 begins counting.

At the point in time of point-in-time t3, the voltage at the gate of the second transistor 301 is higher than the voltage at the gate of the first transistor 102, as described above. Now, according to some embodiments, the ramp signal VRMP changes from higher voltage to lower voltage. Therefore, with the passing of time the voltage at the gate of the second transistor 301 becomes lower than the voltage at the gate of the first transistor 102. That is to say, the size relation of the voltage at the gate of the first transistor 102 and the voltage at the gate of the second transistor 301 is inverted.

The time from the change beginning in the ramp signal VRMP until the voltage size relation is inverted corresponds to the amount of transferred charge. Accordingly, corresponding to the ramp signal VRMP starting to change, the counter 904 begins counting, whereby the digital value corresponding to the amount of transferred charge can be obtained. Specifically, the latch pulse generating unit 901 outputs a latch pulse at the timing when the voltage size relation is inverted. The latch pulse is input into the S-latch circuit 903, and the S-latch circuit 903 holds the count value at the point in time that the latch pulse is input.

Subsequently, the count values held by the memory unit (N-latch circuit 902, S-latch circuit 903) in each pixel column are read out sequentially to the output unit 10 by the horizontal scanning circuit 12. The readout from the memory unit is performed during the readout time period for the second row (point-in-time t4 to point-in-time t7 in FIG. 10). Alternatively, the readout from the memory unit may be performed before the time (point-in-time t4) of starting readout of the next row.

Next, the signal of the pixel 1 in the row second from the top in FIG. 1 is read out during the time period from point-in-time t4 to point-in-time t7. The signal of the pixel 1 in the row third from the top in FIG. 1 is read out during the time period from point-in-time t7 to point-in-time t10.

At point-in-time t4, the pixel 1 included in the second row from the top is selected, and the pixels 1 included in the first and third rows from the top are non-selected. Also, at point-in-time t4, the voltage of the gate of the first transistor 102 and the voltage of the gate of the second transistor 301 included in the pixel 1 in the second row from the top are reset. Next, at point-in-time t5, in the pixel 1 in the second row from the top, the charge is transferred from the photoelectric converter 101 to the gate of the first transistor 102. At point-in-time t6, a comparison with the ramp signal VRMP is started.

At point-in-time t7, the pixels 1 included in the third row from the top are selected, and the pixels 1 included in the first and second rows from the top are non-selected. Also, at point-in-time t7, the voltage of the gate of the first transistor 102 and the voltage of the gate of the second transistor 301 included in the pixel 1 in the third row from the top are reset. Next, at point-in-time t8, in the pixel 1 in the third row from the top, the charge is transferred from the photoelectric converter 101 to the gate of the first transistor 102. At point-in-time t9, a comparison with the ramp signal VRMP is started.

Note that according to some embodiments, a slope-type AD conversion is performed, which compares the signal from the photoelectric converter 101 and the ramp signal VRMP. However, the AD conversion method is not limited to a slope-type. Other AD conversion types may be used.

Also, a signal that is output in a state of the pixel 1 having been reset, and a signal that is output after the charge in the pixel 1 has been transferred, may be read out. Specifically, AD conversion may be performed between point-in-time t1 and point-in-time t2.

As described above, with an imaging device according to some embodiments, a pixel includes a selecting unit, and the selecting unit supplies the gate of the first transistor with the first voltage which turns off the first transistor. According to such a configuration, resistance of the electrical pathway that includes the first transistor can be reduced. Consequently, the imaging device can be driven at a high speed.

Also, according to some embodiments, the electrical pathway that supplies the first voltage and the electrical pathway that supplies the second voltage differ. Therefore, selecting the pixel 1 and non-selecting a different pixel 1 can be performed concurrently. Consequently, the imaging device can be driven at a high speed.

Seventh Embodiment

Figure 11A:
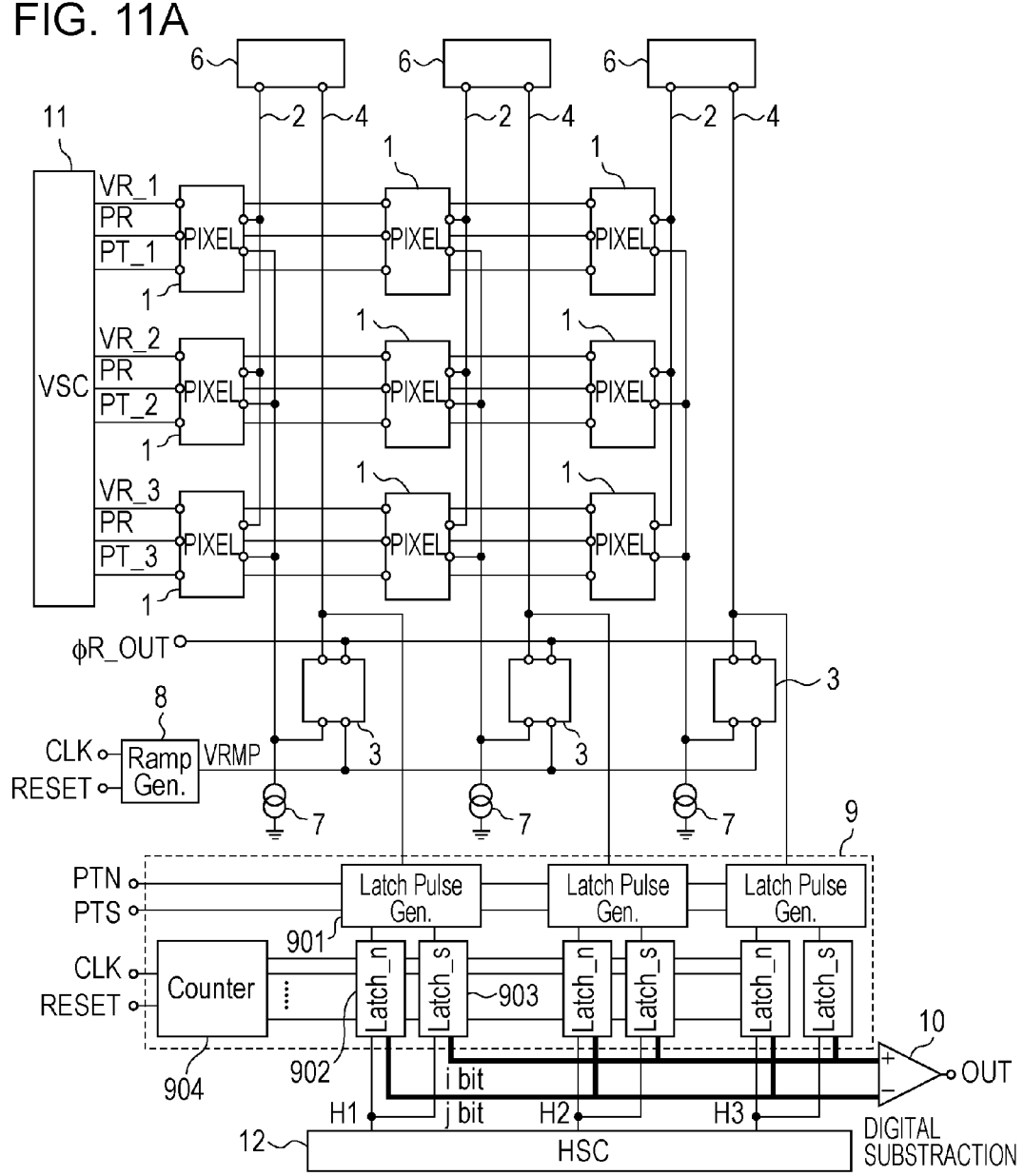
FIG. 11A is a block diagram illustrating a configuration of an imaging device according to the embodiment.

Another embodiment according to the disclosure will be described. A circuit configuration according to some embodiments is illustrated in FIG. 11A. In FIG. 11A, portions having similar functions to FIG. 1 are denoted by the same reference numerals. A feature of some embodiments is that a selective voltage supplying node is disposed on a pixel, wherein a first voltage that non-selects a pixel and a second voltage that selects a pixels are selectively supplied.

An imaging device according to some embodiments has multiple pixels 1, a first node 2, circuit unit 3 that includes a second transistor, second node 4, power source unit 6, current source 7, reference signal output unit 8, AD converter 9, output unit 10, vertical scanning circuit 11, and horizontal scanning circuit 12.

The first transistor included in the pixel 1 and the second transistor included in the circuit unit 3 define, or constitute, a differential pair. The second transistors are disposed at the ratio of one as to multiple pixels. Also, the comparator which the imaging device according to some embodiments has is configured to include a first transistor and second transistor. Each of the multiple pixels 1 includes a selecting unit that turns off the first transistor with the voltage applied to the gate of the first transistor.

The present embodiment differs from the first embodiment in the configuration of the pixel 1, and that the first voltage supply unit 5 has been omitted. Thus, just portions of the present embodiment that differ from the first embodiment will be described. The other portions are similar to the first embodiment. Note that the power source unit 6 according to some embodiments may have a circuit configuration such as those illustrated in FIG. 4B or 4C, similar to the second embodiment. Also, the circuit unit 3 may have a circuit configuration such as that illustrated in FIG. 5B, similar to the third embodiment.

Figure 11B:
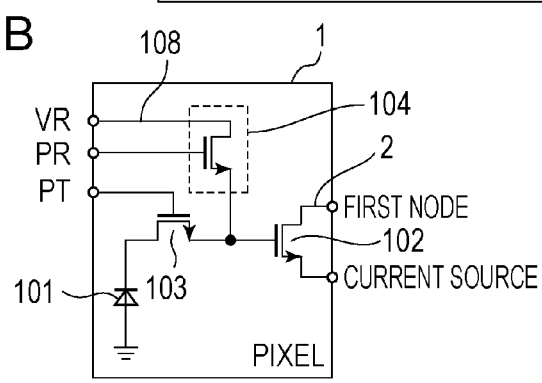
FIG. 11B is a circuit diagram thereof.

FIG. 11B illustrates a circuit configuration of a pixel 1 according to some embodiments. Similar to the first embodiment, the pixel 1 includes a photoelectric converter 101, first transistor 102, and transfer transistor 103. Further, the pixel 1 according to some embodiments includes a selecting transistor 104. The selecting transistor 104 makes up the selecting unit. Also, a selective voltage supplying node 108 is provided to the pixels 1, wherein a first voltage that turns off the first transistor 102 and a second voltage that turns on the first transistor are selectively supplied.

The selecting transistor 104 is an N-channel-type MOS transistor. The drain of the selecting transistor 104 is connected to the selective voltage supplying node 108. The source of the selecting transistor 104 is connected to the gate of the first transistor 102. The driving signal PR is supplied to the gate of the selecting transistor 104 from the vertical scanning circuit 11. The on/off of the selecting transistor 104 is controlled by the driving signal PR. That is to say, the vertical scanning circuit 11 is a control unit that controls the selecting transistor 104.

The selective voltage supplying node 108 is connected to the vertical scanning circuit 11. The vertical scanning circuit 11 selectively supplies the first voltage and second voltage to the selective voltage supplying node 108. According to some embodiments, the first voltage is a grounding voltage. The first voltage is not limited to a grounding voltage, and the voltage between the gate and source of the first transistor 102 only has to be lower than a threshold voltage of the first transistor 102. According to some embodiments, the second voltage is a power voltage. The second voltage is not limited to a power voltage, and the voltage between the gate and source of the first transistor 102 only has to be higher than a threshold voltage of the first transistor 102. The selective voltage supplying node 108 may be configured with a conductive material such as metal, for example.

Also, the selective voltage supplying node 108 may be a common node for multiple pixels 1 included in one pixel row. That is to way, the vertical scanning circuit 11 may supply the first voltage or second voltage serially to multiple pixels 1 included in the same pixel row. Also, the vertical scanning circuit 11 can supply first voltage or second voltage, mutually independently, to multiple pixels 1 included in different pixel rows.

Operations to select or non-select a pixel 1 according to such a configuration will be described. First, when non-selecting a pixel 1, the vertical scanning circuit 11 supplies the first voltage to the selective voltage supplying node 108. When the first voltage is supplied to the selective voltage supplying node 108, the first voltage is applied to the gate of the first transistor 102 by the selecting transistor 104 being turned on. Thus, the first transistor 102 is turned off. The gate of the first transistor 102 is floated by the selecting transistor 104 being turned off, whereby the second voltage is held at the gate. Next, when selecting a pixel 1, the vertical scanning circuit 11 supplies the second voltage to the selective voltage supplying node 108. When the second voltage is supplied to the selective voltage supplying node 108, the second voltage is applied to the gate of the first transistor 102 by the selecting transistor 104 being turned on. Thus, the second transistor 102 is turned on. The gate of the first transistor 102 can be floated by the selecting transistor 104 being turned off, whereby the second voltage is held at the gate.

Thus, according to some embodiments, by switching the voltage supplied to the selective voltage supplying node 108, whether to select or non-select a pixel 1 when the selecting transistor 104 is turned on can be switched. According to such a configuration, selecting a pixel 1 and non-selecting a different pixel 1 can be performed concurrently. Consequently, the imaging device can be driven at a high speed.

Next, operations of an imaging device according to some embodiments will be described. Operations to read out a signal at the time that the pixel 1 is reset (hereinafter called N-signal) and a signal after the charge in the pixel 1 has been transferred (hereinafter called S-signal) will be described according to some embodiments. By reading out the S-signal and N-signal and computing the difference between the two, fixed-pattern noise in the pixel 1 can be reduced. Note that differential processing of the S-signal and N-signal may be performed in embodiments 1 through 6.

Figure 12:
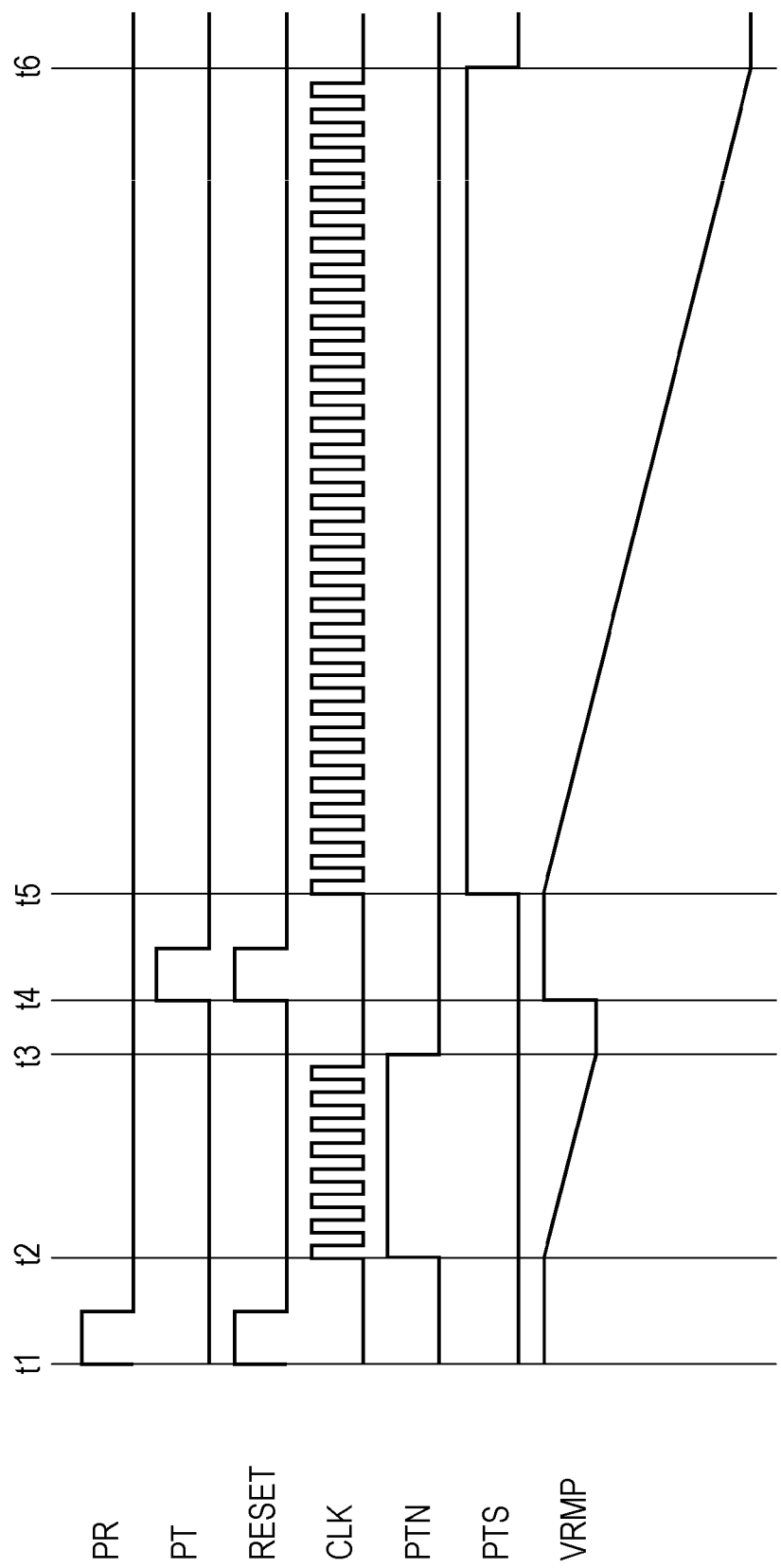
FIG. 12 is a diagram schematically illustrating a timing chart of a driving signal of an imaging device according to the embodiment.

FIG. 12 illustrates a timing chart of the driving signals and reference signal. The driving signals PR and PT are supplied to the gate of the selecting transistor 104 and the gate of the transfer transistor 103 in FIG. 11B, respectively. The driving signal RESET is supplied to the reference signal output unit 8. The clock signal CLK is supplied to the counter 904. The driving signals PTN and PTS are supplied to the latch pulse generating unit 901. The ramp signal VRMP is a reference signal that is output by the reference signal output unit 8. Note that an example of the circuit unit 3 that includes a second transistor, in the circuit configuration illustrated in FIG. 2F, will be described here.

In FIG. 10, the high level driving signals PR and PT are voltages that turn on an N-channel-type transistor. In the same diagram, the low level driving signal is a voltage that turns off the N-channel-type transistor. The high level driving signal is a power voltage, for example. The low level driving signal is a grounding voltage, for example.

At point-in-time t1, the driving signal PR and the driving signal RESET are at high levels. The other driving signals are at low levels. By the driving signal PR being at a high level, the selecting transistor 104 is turned on. Thus, the pixel 1 where the first voltage is supplied to the selective voltage supplying node 108 is non-selected. On the other hand, the pixel 1 where the second voltage is supplied to the selective voltage supplying node 108 is selected. Note that according to some embodiments, the driving signal PR may be supplied in common to all of the pixels 1. By the driving signal RESET being at a high level, the ramp signal VRMP which outputs the reference signal output unit 8 is reset to initial values. Upon a predetermined amount of time having passed from point-in-time t1, the driving signals PR and RESET have a low level. Hereafter, operations in the case that a pixel 1 is selected will be described.

A point-in-time t2, the ramp signal VRMP is output. That is to say, the voltage that outputs the reference signal output unit 8 starts changing from the initial values. Correspondingly, the counter 904 of the AD converter 9 begins counting. Thus, a signal that is output from the pixel 1 while the pixel 1 is in a reset state, i.e. an N-signal, is subjected to AD conversion.

Also, at point-in-time t2, the driving signal PTN is at a high level. Thus, a latch-pulse from the latch pulse generating unit 901 is input into the N-latch circuit 902. That is to say, the digital signal converted from the N-signal is held in the N-latch circuit 902. Subsequently, at point-in-time t3, the driving signal PTN is at a low level.

Next, at point-in-time t4, the driving signals PT and RESET are at high levels. By the driving signal PT being at a high level, the charge accumulated in the photoelectric converter 101 is transferred to the gate of the first transistor 102. Note that the driving signal PT is supplied only to selected pixels 1. Also, by the driving signal RESET being at a high level, the ramp signal VRMP output by the reference signal output unit 8 is reset to initial values.

Next, at point-in-time t5, the ramp signal VRMP is output. That is to say, the voltage output by the reference signal output unit 8 begins to change from the initial values. Correspondingly, the counter 904 of the AD converter 9 begins counting. Thus, a signal that is output after the charge in the pixel 1 has been transferred, i.e. an S-signal, is subjected to AD conversion.

Also, at point-in-time t5, the driving signal PTS is at a high level. Thus, a latch-pulse from the latch pulse generating unit 901 is input into the S-latch circuit 903. That is to say, the digital signal converted from the S-signal is held in the S-latch circuit 903. Subsequently, at point-in-time t6, the driving signal PTS is at a low level.

With the operations described above, the N-signal is held in the N-latch circuit 902, and the S-signal is held in the S-latch circuit 903. Subsequently, differential processing of the S-signal and N-signal are performed in the output unit 10, and a digital signal based on the difference thereof is output.

Note that according to some embodiments, a slope-type AD conversion is performed, which compares the signal from the photoelectric converter 101 and the ramp signal VRMP. However, the AD conversion method is not limited to a slope-type. Other AD conversion types may be used.

As described above, in an imaging device according to some embodiments, a pixel includes a selecting unit, and the selecting unit supplies the gate of the first transistor with the first voltage which turns off the first transistor. According to such a configuration, resistance of the electrical pathway that includes the first transistor can be reduced. Consequently, the imaging device can be driven at a high speed.

Also, according to some embodiments, the first voltage that turns off the first transistor and the second voltage that turns on the first transistor are supplied via the selecting transistor, whereby the number of pixel transistors can be reduced. Consequently, the area on a pixel covered by photoelectric converters can be increased. Note that by omitting the transfer transistor, the ratio of area covered by photoelectric converters can be increased further.

Also, according to some embodiments, by switching the voltage supplied to the selective voltage supplying node whether to select or non-select a pixel when the selecting transistor is turned on can be switched. According to such a configuration, selecting a pixel and non-selecting a different pixel can be performed concurrently. Consequently, the imaging device can be driven at a high speed.

Eighth Embodiment

Figure 13:
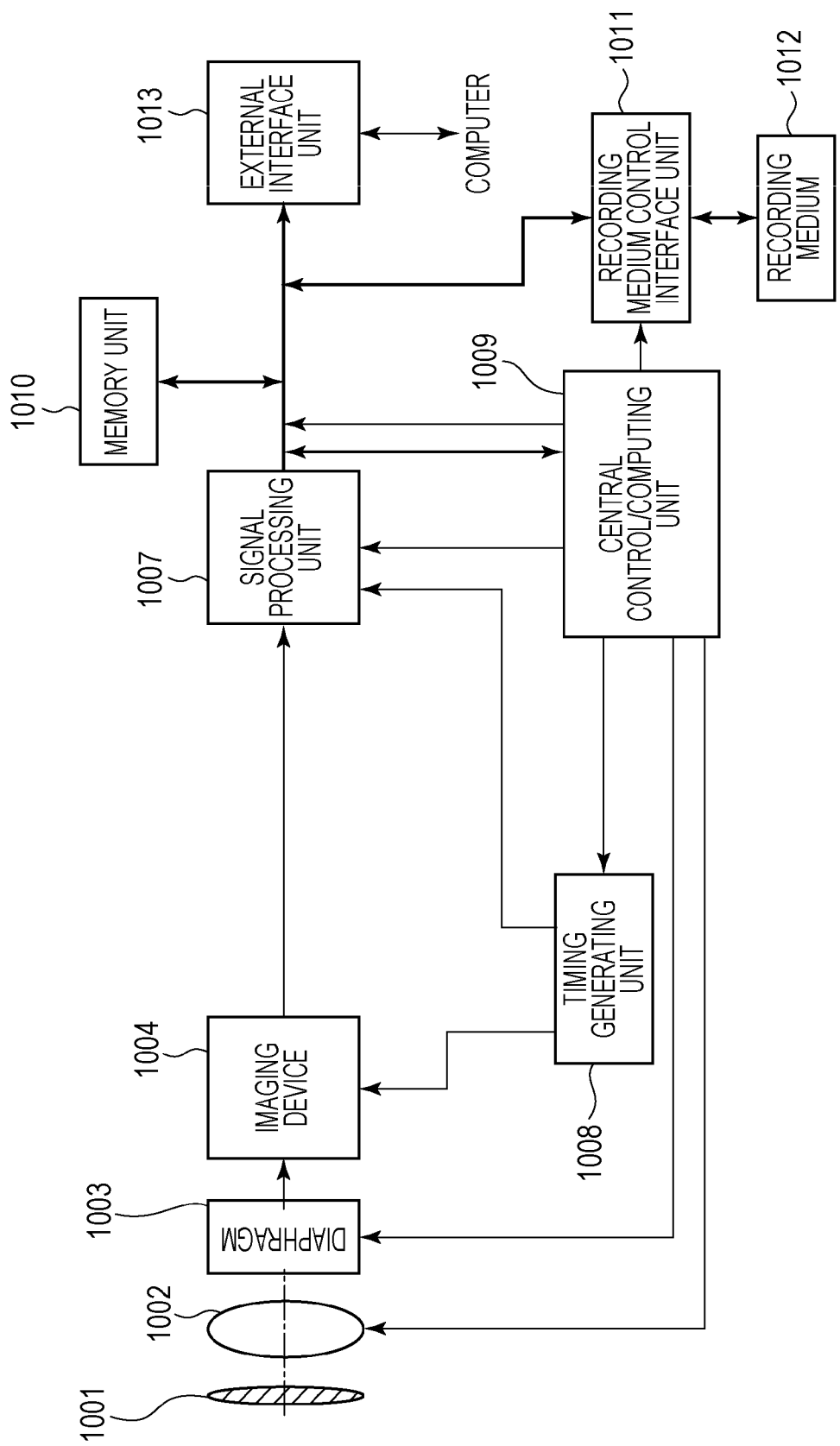
FIG. 13 is a block diagram illustrating a configuration of an imaging system according to the embodiment.

An embodiment of an imaging system according to the disclosure will be described. Examples of an imaging system may be a digital still camera, digital camcorder, photocopier, fax machine, cellular phone, car-mounted camera, observation satellite, and so forth. FIG. 13 illustrates a block diagram of a digital still camera as an example of an imaging system.

In FIG. 13, reference numeral 1001 denotes a barrier to protect the lens, reference numeral 1002 denotes a lens to form an optical image of a subject on an imaging device 1004, and reference numeral 1003 denotes a diaphragm to change the amount of light passing through the lens 1002. Reference numeral 1004 denotes the imaging device described according to the embodiments above, and converts optical images formed by the lens 1002 as image data. Now, an AD converter is formed on a semiconductor substrate of the imaging device 1004. Reference numeral 1007 denotes a signal processing unit to correct various types of imaging data output by the imaging device 1004 and compress data. In FIG. 13, reference numeral 1008 denotes a timing generating unit that outputs various types of timing signals to the imaging device 1004 and signal processing unit 1007, and reference numeral 1009 denotes an overall control unit that controls the overall digital still camera. Reference numeral 1010 denotes a frame memory unit to temporarily store image data, reference numeral 1011 denotes an interface unit to perform recording or readout to a recording medium, and reference numeral 1012 denotes a detachable storage medium such as a semiconductor memory or the like to perform recording or readout of the imaging data. Reference numeral 1013 denotes an interface unit to communicate with an external computer or the like. Now, the timing signals and the like may be input external to the imaging system, and the imaging system has at least an imaging device 1004 and a signal processing unit 1007 to process the imaging signals output from the imaging device 1004.

A configuration where the imaging device 1004 and AD converter are formed on the same semiconductor substrate according to some embodiments is described. However, the imaging device 1004 and AD converter may be provided on separate semiconductor substrates. Also, the imaging device 1004 and signal processing unit 1007 may be formed on the same substrate.

As described above, the imaging device according to embodiments of the disclosure can be applied to an imaging system. By applying the imaging device according to the disclosure to an imaging system, the imaging system may be driven at a high speed.

One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-050684 filed Mar. 7, 2012, which is hereby incorporated by reference herein in its entirety.

What is claimed is:

1. An imaging device comprising:
   a plurality of pixels, each of the plurality of pixels including
      a photoelectric converter, and
      a first transistor having an input for a signal based on a charge generated by the photoelectric converter;
   a second transistor having an input for a reference signal, arranged at a ratio of one as to a plurality of the first transistors in the plurality of pixels, the second transistor and the first transistor in each of the plurality of pixels forming a differential pair which operates as a comparator in an analog-to-digital converter;
a reference signal output unit configured to output the reference signal; and
a fifth connecting transistor configured to connect a control node of the second transistor and a main node of the second transistor;
wherein each of the plurality of pixels further includes a selecting unit configured to turn off the first transistor by applying a first voltage to a control node of the first transistor, and
wherein the reference signal output unit is connected to the control node of the second transistor.

2. The imaging device according to claim 1, further comprising:
a first voltage node configured to supply the first voltage;
wherein the selecting unit includes a selecting transistor configured to connect the first voltage node and the control node of the first transistor.

3. The imaging device according to claim 2, further comprising a first node,
wherein main nodes of the first transistors included in different pixels are connected to the first node;
wherein each of the plurality of pixels includes a fourth connecting transistor configured to connect the first node and the control node of the first transistor;
and wherein a second voltage for turning on the first transistor is to be supplied to the control node of the first transistor via the fourth connecting transistor.

4. The imaging device according to claim 1, further comprising:
a voltage supplying node configured to selectively supply the first voltage and a second voltage for turning on the first transistor;
wherein the selecting unit includes a selecting transistor configured to connect the voltage supplying node and the control node of the first transistor.

5. An imaging device comprising:
a plurality of pixels, each of the plurality of pixels including a photoelectric converter, and
a first transistor having an input for a signal based on a charge generated by the photoelectric converter;
a second transistor having an input for a reference signal, arranged at a ratio of one as to a plurality of the first transistors in the plurality of pixels, the second transistor and the first transistor in each of the plurality of pixels forming a differential pair which operates as a comparator in an analog-to-digital converter;
a reference signal output unit configured to output the reference signal;
a capacitance wherein one node of the capacitance is connected to a control node of the second transistor and another node of the capacitance is connected to the reference signal output unit; and
a sixth connecting transistor configured to connect the control node of the second transistor and a main node of the second transistor,
wherein each of the plurality of pixels further includes a selecting unit configured to turn off the first transistor by applying a first voltage to a control node of the first transistor.

6. The imaging device according to claim 5, wherein the selecting unit includes a selecting transistor configured to connect a main node of the first transistor and the control node of the first transistor.

7. The imaging device according to claim 6, the imaging device further comprising:
a first node; and
a voltage supplying unit including
a first connecting transistor and
a first voltage node configured to supply the first voltage,
wherein the main nodes of the first transistors included in different pixels are connected to the first node,
and wherein the first connecting transistor connects the first node and the first voltage node.

8. The imaging device according to claim 7, further comprising:
a power source node configured to supply a power voltage;
wherein the voltage supplying unit includes a second connecting transistor of a conductive type opposite to that of the first connecting transistor;
wherein the second connecting transistor is configured to control a conductive state of an electrical pathway between the first node and the power source node; and
wherein a control node of the first connecting transistor and a control node of the second connecting transistor are connected.

9. The imaging device according to claim 7, further comprising:
a control unit configured to control the selecting transistor and the voltage supplying unit so that the selecting transistor is turned on when the voltage supplying unit is supplying the first voltage to the first node.

10. The imaging device according to claim 6, further comprising:
a first node; and
a voltage supplying unit configured to supply the first node selectively with the first voltage and a second voltage being different from the first voltage,
wherein the main nodes of the first transistors included in different pixels are connected to the first node.

11. The imaging device according to claim 6, further comprising:
a first node; and
a third connecting transistor configured to connect the first node and a main node of the second transistor,
wherein the main nodes of the first transistors included in different pixels are connected to the first node.

12. The imaging device according to claim 6, further comprising:
a second voltage node configured to supply a second voltage for turning on the first transistor;
wherein each of the plurality of pixels further includes a reset transistor configured to connect the second voltage node and the control node of the first transistor.

13. The imaging device according to claim 5, further comprising:
a first voltage node configured to supply the first voltage;
wherein the selecting unit includes a selecting transistor configured to connect the first voltage node and the control node of the first transistor.

14. The imaging device according to claim 5, further comprising:
a voltage supplying node configured to selectively supply the first voltage and a second voltage for turning on the first transistor;
wherein the selecting unit includes a selecting transistor configured to connect the voltage supplying node and the control node of the first transistor.

15. An imaging system, comprising:
ing device according to claim 5; and
a signal processing unit configured to process signals output from the imaging device.

16. An imaging device comprising:
a plurality of pixels, each of the plurality of pixels including
   a photoelectric converter, and
   a first transistor having an input for a signal based on a charge generated by the photoelectric converter;
a second transistor having an input for a reference signal, arranged at a ratio of one as to a plurality of the first transistors in the plurality of pixels, the second transistor and the first transistor in each of the plurality of pixels forming a differential pair which operates as a comparator in an analog-to-digital converter;
a reference signal output unit configured to output the reference signal;
a first node; and
a seventh connecting transistor configured to connect the reference signal output unit and the first node;
wherein main nodes of the first transistors included in different pixels are connected to the first node, and
wherein each of the plurality of pixels further includes a selecting unit configured to turn off the first transistor by applying a first voltage to a control node of the first transistor.

17. The imaging device according to claim 16, wherein the reference signal output unit is configured to output the first voltage.

* * * * *